US008810621B2

(12) United States Patent
Suzuki et al.

(10) Patent No.: US 8,810,621 B2
(45) Date of Patent: Aug. 19, 2014

(54) OPTICAL SCANNING DEVICE INCLUDING A ROTATING BODY

(71) Applicant: Fuji Xerox Co., Ltd., Tokyo (JP)

(72) Inventors: Yoshiyuki Suzuki, Kanagawa (JP); Keiichi Mikami, Kanagawa (JP); Naoyuki Tada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/675,571

(22) Filed: Nov. 13, 2012

(65) Prior Publication Data
US 2013/0293659 A1 Nov. 7, 2013

(30) Foreign Application Priority Data

May 1, 2012 (JP) ................................. 2012-104683

(51) Int. Cl.
*B41J 15/14* (2006.01)
*B41J 27/00* (2006.01)

(52) U.S. Cl.
USPC .......................................... 347/242; 347/257

(58) Field of Classification Search
USPC .................... 347/231, 241–245, 256–261
See application file for complete search history.

(56) References Cited

U.S. PATENT DOCUMENTS

2011/0128342 A1 *  6/2011  Ishidate ........................ 347/224

FOREIGN PATENT DOCUMENTS

| JP | 2008003231 A | * | 1/2008 | ............. G02B 26/10 |
| JP | A-2008-003231 | | 1/2008 | |
| JP | 2008058353 A | * | 3/2008 | ............. G02B 26/12 |
| JP | A-2008-058353 | | 3/2008 | |

* cited by examiner

*Primary Examiner* — Hai C Pham
(74) *Attorney, Agent, or Firm* — Oliff PLC

(57) ABSTRACT

An optical scanning device includes a rotating body having a rotating polygon mirror that deflects a light beam; a circuit board having a supporting member that supports the rotating member and a driving unit that drives the rotating body; a container containing the rotating body and the circuit board and having a positioning portion that positions a positioned portion of the rotating body, the positioned portion projecting from the circuit board; first and second fastening portions that fasten the circuit board to the container; and an adjusting portion that adjusts an angle of a rotating shaft of the rotating body with respect to the container. A virtual straight line connecting the first and second fastening portions passes through the rotating body when seen in an axial direction of the rotating shaft. The adjusting portion resides on a side of the virtual straight line opposite the rotating shaft.

4 Claims, 23 Drawing Sheets

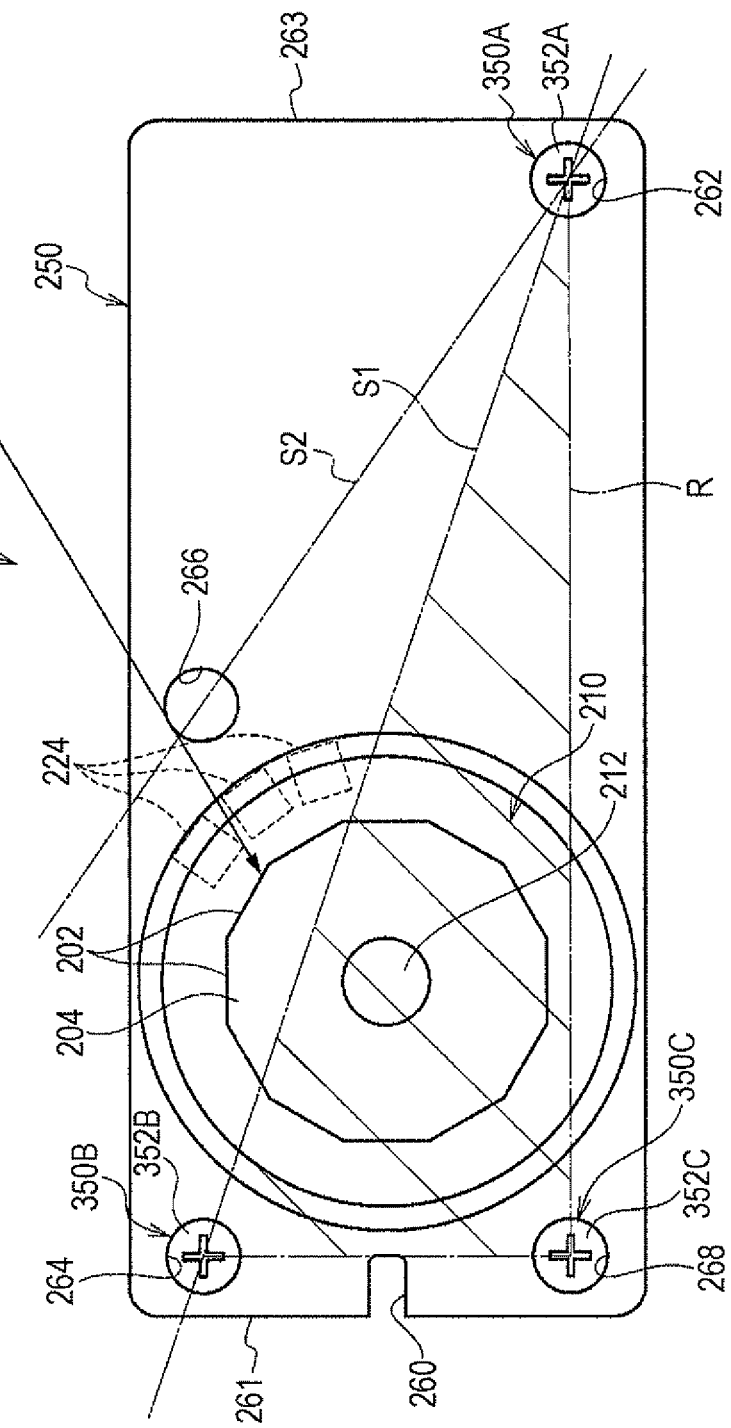

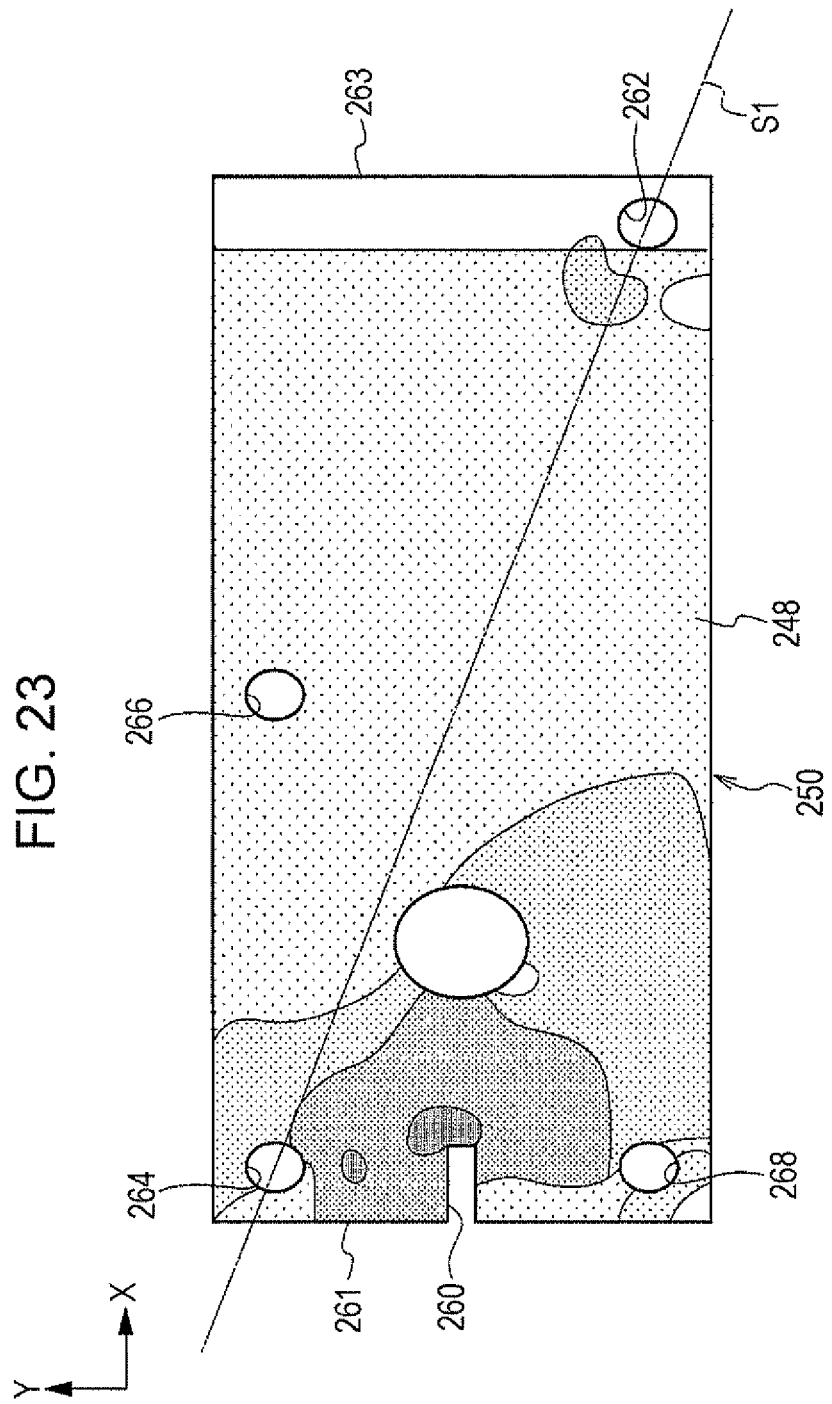

OPTICAL SCANNING DEVICE INCLUDING A ROTATING BODY

CROSS-REFERENCE TO RELATED APPLICATIONS

This application is based on and claims priority under 35 USC 119 from Japanese Patent Application No. 2012-104683 filed May 1, 2012.

BACKGROUND

Technical Field

The present invention relates to an optical scanning device and an image forming apparatus.

SUMMARY

According to an aspect of the invention, there is provided an optical scanning device including a rotating body having a rotating polygon mirror that deflects a light beam emitted from a light source; a circuit board having a supporting member and a driving unit, the rotating body being rotatably supported by the supporting member, the driving unit driving the rotating body; a container having a positioning portion that positions a positioned portion included in the rotating body, the positioned portion projecting from the circuit board, the container containing the rotating body and the circuit board; a first fastening portion and a second fastening portion that fasten the circuit board to the container; and an adjusting portion that adjusts an angle of a rotating shaft of the rotating body with respect to the container. The first fastening portion and the second fastening portion are provided such that a virtual straight line drawn on the circuit board from the first fastening portion to the second fastening portion passes through the rotating body when seen in an axial direction of the rotating shaft of the rotating body. The adjusting portion is provided on a side of the virtual straight line on which the rotating shaft is provided.

BRIEF DESCRIPTION OF THE DRAWINGS

An exemplary embodiment of the present invention will be described in detail based on the following figures, wherein:

FIG. 14 illustrates a virtual straight line S1, a virtual straight line S2, and a virtual triangle R;

FIG. 23 illustrate a distribution of stress applied to the circuit board whose angle has been adjusted.

DETAILED DESCRIPTION

An image forming apparatus according to an exemplary embodiment of the present invention will now be described.
Overall Configuration of Image Forming Apparatus An overall configuration of the image forming apparatus according to the exemplary embodiment of the present invention will first be described.

Figure 1:
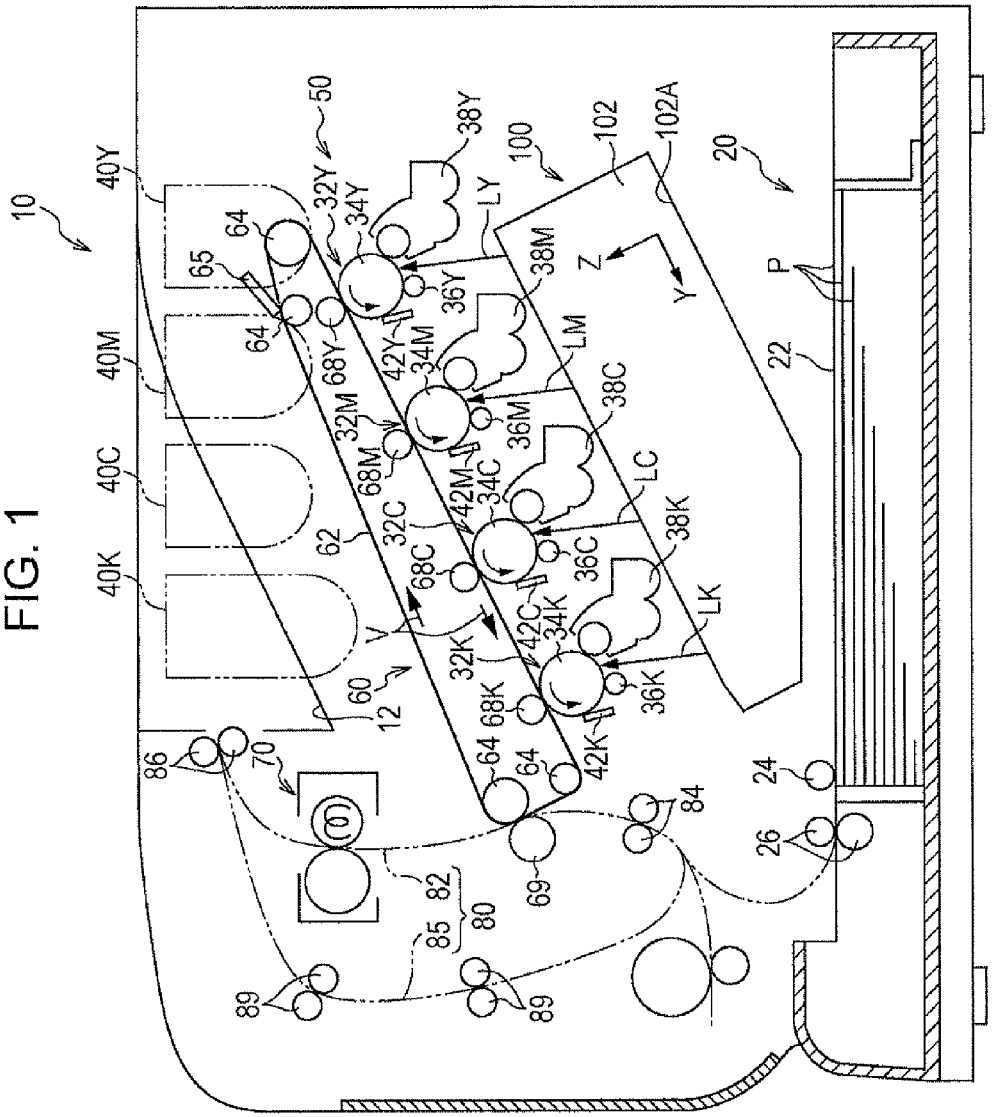
FIG. 1 illustrates a configuration of an image forming apparatus including an optical scanning device according to the exemplary embodiment of the present invention.

Referring to FIG. 1, an image forming apparatus 10 includes an image forming section 50, a paper feeding device 20 that feeds recording paper P to the image forming section 50, an optical scanning device 100, and so forth. The recording paper P is transported along a transport path 80 provided in the image forming apparatus 10 and is output to a paper output portion 12 provided at the top of the image forming apparatus 10.

The image forming section 50 includes image forming units 32Y, 32M, 32C, and 32K provided in correspondence with four colors of yellow (Y), magenta (M), cyan (C), and black (K). The image forming units 32Y, 32M, 32C, and 32K all have the same configuration except that different colors of toners are contained therein. Hereinafter, colors allocated to members and devices, including the image forming units 32Y, 32M, 32C, and 32K, are represented by reference characters (Y, M, C, and K) corresponding to the respective colors and added to individual reference numerals, although the reference characters corresponding to the respective colors are omitted if the members and devices do not need to be identified by their colors.

The image forming units 32Y, 32M, 32C, and 32K are arranged side by side at intervals in a direction angled with respect to the horizontal level. The positions of the image forming units 32Y, 32M, 32C, and 32K become lower in that order.

The image forming units 32Y, 32M, 32C, and 32K include respective drum-type photoconductors 34Y, 34M, 34C, and 34K as exemplary latent image carriers, respective charging members 36Y, 36M, 36C, and 36K as exemplary charging units, respective developing devices 38Y, 38M, 38C, and 38K as exemplary developing units, and respective cleaning devices 42Y, 42M, 42C, and 42K.

The developing devices 38 develop electrostatic latent images formed on the surfaces of the respective photoconductors 34Y, 34M, 34C, and 34K, thereby forming toner images in the colors of yellow (Y), magenta (M), cyan (C), and black (K) on the respective photoconductors 34Y, 34M, 34C, and 34K. The electrostatic latent images are formed by the optical scanning device 100, which will be described separately below. A yellow toner, a magenta toner, a cyan toner, and a black toner are supplied to the developing devices 38Y, 38M, 38C, and 38K from storage containers 40Y, 40M, 40C, and 40K, respectively.

The image forming section 50 includes a transfer device 60 that transfers, to the recording paper P, the toner images in yellow (Y), magenta (M), cyan (C), and black (K) formed by the respective developing devices 38Y, 38M, 38C, and 38K, and a fixing device 70 that fixes the toner images transferred to the recording paper P by the transfer device 60 on the recording paper P.

The transfer device 60 includes a belt-type intermediate transfer body 62 as an exemplary transfer medium to which the toner images in yellow (Y), magenta (M), cyan (C), and black (K) formed by the respective photoconductors 34Y, 34M, 34C, and 34K are transferred in such a manner as to be superposed one on top of another. The intermediate transfer body 62 is stretched around plural rollers 64 and rotates in a direction of arrow V illustrated in FIG. 1.

The transfer device 60 includes roller-type first transfer members 68Y, 68M, 68C, and 68K that transfer the toner images in yellow (Y), magenta (M), cyan (C), and black (K) formed on the respective photoconductors 34Y, 34M, 34C, and 34K to the intermediate transfer body 62; a roller-type second transfer member 69 that transfers the toner images in yellow (Y), magenta (M), cyan (C), and black (K) transferred to the intermediate transfer body 62 to the recording paper P; and a cleaning device 65 that cleans the surface of the intermediate transfer body 62.

The paper feeding device 20 includes a container 22 that contains pieces of recording paper P, a pickup roller 24 that picks up the topmost one of the pieces of recording paper P contained in the container 22, and a pair of transport rollers 26 that transport the piece of recording paper P picked up by the pickup roller 24.

The transport path 80 includes a transport path 82 and a reverse transport path 85. The transport path 82 is a transport path along which the recording paper P fed from the paper feeding device 20 is transported toward the paper output portion 12. A pair of registration rollers 84, the above-mentioned second transfer member 69, the above-mentioned fixing device 70, and a pair of paper output rollers 86 are provided on the transport path 82 in that order from the upstream side in the direction of transport of the recording paper P.

The pair of registration rollers 84 feed the recording paper P into the nip between the intermediate transfer body 62 and the second transfer member 69 in accordance with the timing that the toner images are transferred to the intermediate transfer body 62.

The pair of paper output rollers 86 output the recording paper P having the toner images fixed thereon by the fixing device 70 to the paper output portion 12. In a case where images are to be formed on both sides of the recording paper P, the pair of paper output rollers 86 rotate in a backward direction opposite to the direction in which the recording paper P is output to the paper output portion 12, and thus feed the recording paper P, having an image on one side thereof, in such a manner as to guide the trailing end of the recording paper P into the reverse transport path 85. Plural pairs of transport rollers 89 are provided on the reverse transport path 85. The recording paper P having an image on one side thereof is transported by the pairs of transport rollers 89 in such a manner as to be turned over and is then fed to a position on the upstream side of the pair of registration rollers 84 again.

Image Forming Process

An image forming process will now be described.

When the image forming apparatus 10 is activated, pieces of image data on the respective colors of yellow (Y), magenta (M), cyan (C), and black (K) are output to the optical scanning device 100. The optical scanning device 100 emits light beams LY, LM, LC, and LK in accordance with the respective pieces of image data. The light beams LY, LM, LC, and LK are applied to the surfaces (outer circumferential surfaces) of the respective photoconductors 34 that have been charged by the respective charging members 36, whereby electrostatic latent images are formed on the surfaces of the respective photoconductors 34.

The electrostatic latent images formed on the surfaces of the photoconductors 34 are developed by the respective developing devices 38, whereby toner images in the respective colors are formed on the surfaces of the respective photoconductors 34. The toner images in the respective colors on the surfaces of the photoconductors 34 are sequentially and multiply transferred to the intermediate transfer body 62 by the respective first transfer members 68.

The toner images multiply transferred to the intermediate transfer body 62 are second-transferred by the second transfer member 69 to the recording paper P that has been transported to the second transfer member 69. The recording paper P having the toner images transferred thereto is transported to the fixing device 70. In the fixing device 70, the toner images are heated and pressed, thereby being fixed into a fixed image on the recording paper P. The recording paper P having the fixed image is output to the paper output portion 12 by the pair of paper output rollers 86.

In a case of duplex printing in which another image is to be formed on the other side (a side not having the fixed image) of the recording paper P, the pair of paper output rollers 86 rotate backward after the toner images on the front side of the recording paper P are fixed by the fixing device 70, whereby the recording paper P is fed into the reverse transport path 85. Then, after another set of toner images are formed and fixed on the other side of the recording paper P, the recording paper P is output to the paper output portion 12.

Optical Scanning Device

The optical scanning device 100 will now be described.

Referring to FIG. 1, as described above, the optical scanning device 100 scanningly applies the light beams LY, LM, LC, and LK to the respective photoconductors 34Y, 34M, 34C, and 34K that have been charged by the respective charging members 36Y, 36M, 36C, and 36K, thereby forming latent images on the surfaces of the respective photoconductors 34Y, 34M, 34C, and 34K.

Figure 2:
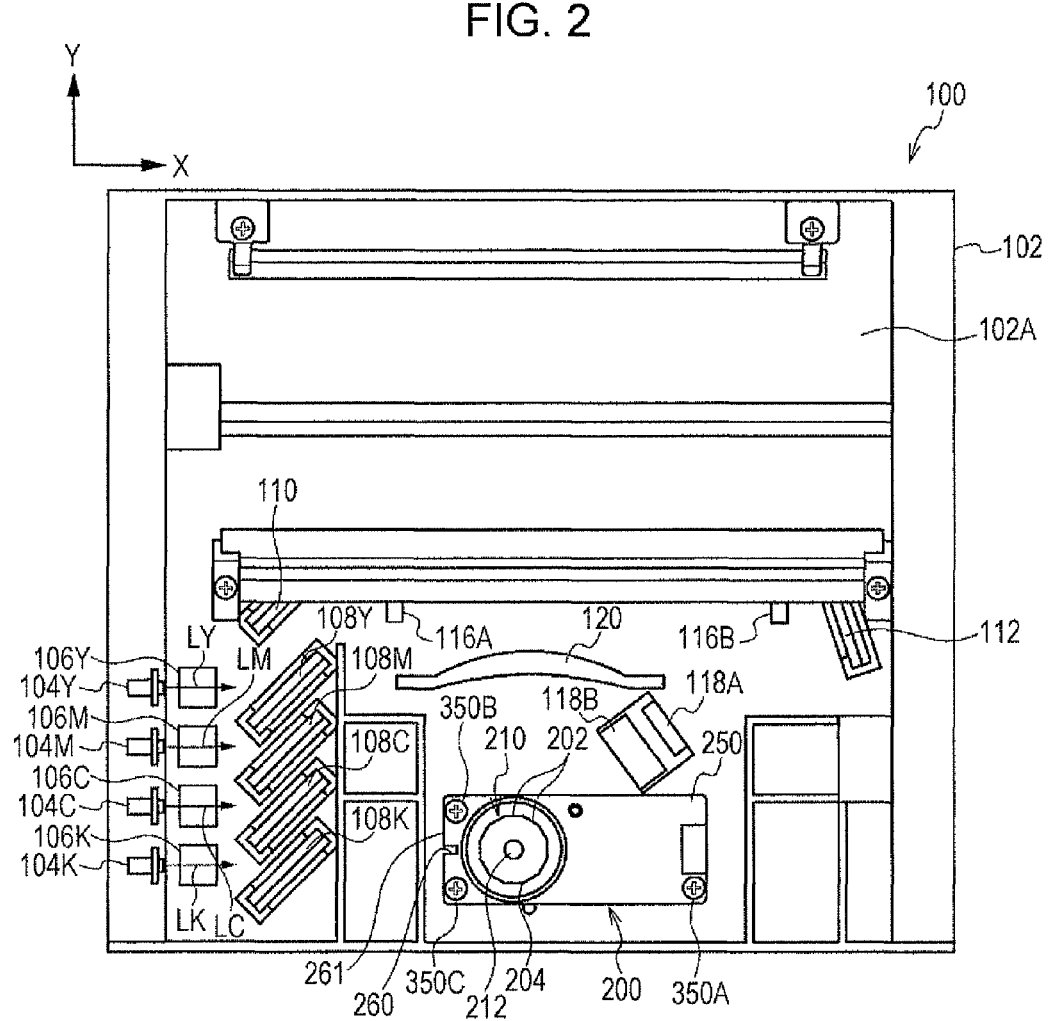
FIG. 2 is a plan view illustrating the inside of the optical scanning device according to the exemplary embodiment of the present invention that is seen in the axial direction of a rotating shaft of a rotating body.
Figure 3:
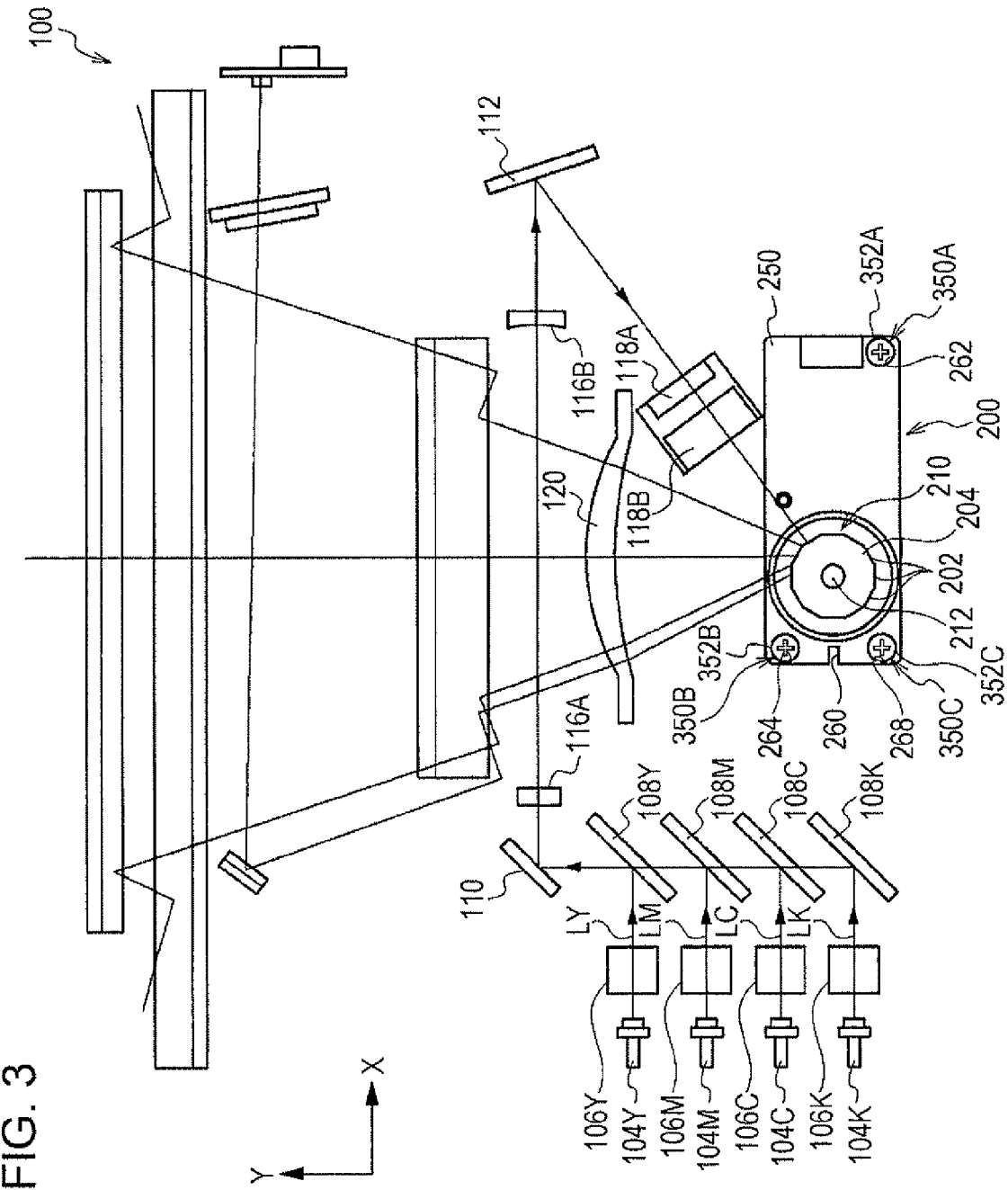
FIG. 3 illustrates optical paths of light beams in the optical scanning device according to the exemplary embodiment of the present invention that are seen in the axial direction of the rotating shaft.

The optical scanning device 100 includes a housing (optical box) 102 as an exemplary container that is fastened at a predetermined position in the image forming apparatus 10. Referring to FIG. 2, light sources 104Y, 104M, 104C, and 104K are provided at an inner end of the housing 102. The light sources 104Y, 104M, 104C, and 104K emit the light beam LY for yellow (Y), the light beam LM for magenta (M), the light beam LC for cyan (C), and the light beam LK for black (K), respectively, as illustrated in FIGS. 2 and 3.

As mentioned above, members provided for the respective colors are identified by the reference characters (Y, M, C, and K) representing the respective colors added at the end of individual reference numerals, although the reference characters at the end of individual reference numerals are omitted if the members do not need to be identified by their colors.

The direction, i.e., the optical-axis direction, in which the light beams L are emitted from the light sources 104 is defined as x direction, the direction orthogonal to the X direction and parallel to a bottom plate 102A of the housing 102 is defined as Y direction, and the direction orthogonal to both the x direction and the Y direction is defined as Z direction. Although the optical scanning device 100 is actually angled with respect to the horizontal level as illustrated in FIG. 1, the optical scanning device 100 is described by defining the X direction and the Y direction as the horizontal direction and the Z direction as the vertical direction, as a matter of convenience. In the exemplary embodiment, the Z direction coincides with the thickness direction of the bottom plate 102A, which will be described separately below. The axial direction of a rotating shaft 212 of a rotating body 210 included in a deflector 200, which will be described separately below, is adjusted in such a manner as to coincide with the Z direction.

Referring to FIG. 2, the light sources 104Y, 104M, 104C, and 104K are provided at intervals in the Y direction and at different positions in the Z direction, so that the light beams LY, LM, LC, and LK (see FIG. 4) do not interfere with one another. In the exemplary embodiment, the distances between the bottom plate 102A and the light sources 104Y, 104M, 104C, and 104K become smaller in that order (see FIG. 4 also).

Figure 7:
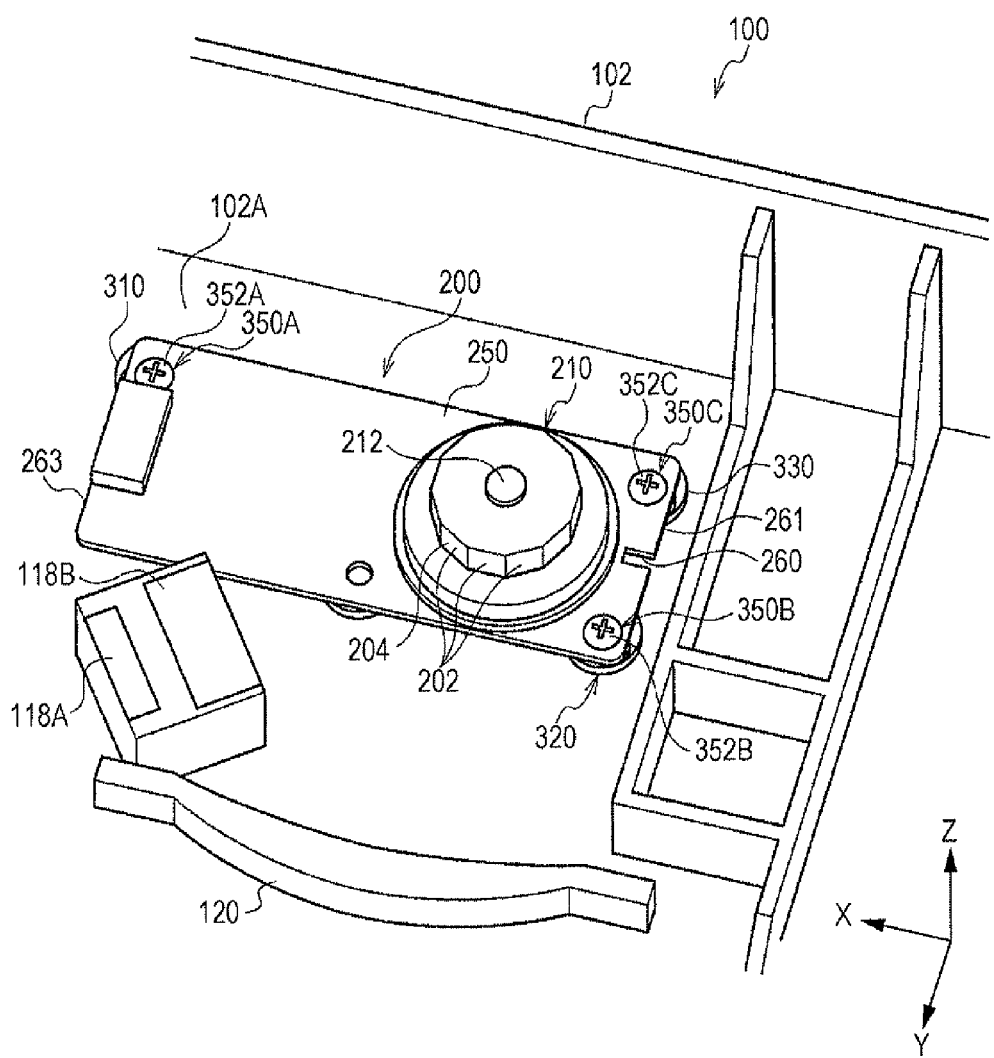
FIG. 7 is a perspective view of the deflector provided in the optical scanning device according to the exemplary embodiment of the present invention.

Referring to FIGS. 2, and 7, the deflector 200 is fastened to the bottom plate 102A of the housing 102 of the optical scanning device 100. The deflector 200 includes the rotating body 210. The rotating body 210 includes a rotating polygon mirror 204 having plural (twelve in the exemplary embodiment) reflecting surfaces 202. The rotating body 210 is provided on a circuit board 250 that is fastened to the bottom plate 102A of the housing 102. The rotating body 210 is rotated by a driving motor 221, to be described below (see FIG. 12), provided on the circuit board 250. The rotating body 210 reflects the light beams L emitted from the respective light sources 104 (see FIG. 2) and applies the light beams L to the respective photoconductors 34 (see FIG. 1) in such a manner as to scanningly move the light beams L in a scanning direction (a direction corresponding to the axial direction of the photoconductors 34).

Referring to FIGS. 2 and 3, first lens systems 106Y, 106M, 1060, and 106K provided for the respective colors and each including a collimator lens or the like that collimates a corresponding one of the light beams L emitted from the light sources 104 are provided on the downstream side of the respective light sources 104. First reflecting mirrors 108Y, 108M, 108C, and 108K are provided on the downstream side of the respective first lens systems 106. A second reflecting mirror 110 is provided on the downstream side of the first reflecting mirrors 108Y, 108M, 108C, and 108K. A third reflecting mirror 112 is provided on the downstream side of the second reflecting mirror 110. Second lens systems 116A and 116B are provided between the second reflecting mirror 110 and the third reflecting mirror 112. Third lens systems 118A and 118B are provided between the third reflecting mirror 112 and the deflector 200.

The light beams LY, LM, LC, and LK emitted from the light sources 104Y, 104M, 104C, and 104K are transmitted through the respective first lens systems 106Y, 106M, 106C, and 106K, are reflected by the respective first reflecting mirrors 108Y, 108M, 108C, and 108K, and travel toward the second reflecting mirror 110. The light beams L reflected by the second reflecting mirror 110 travel toward the third reflecting mirror 112 while being transmitted through the second lens systems 116A and 116B, and are reflected by the third reflecting mirror 112 toward the rotating body 210 (the rotating polygon mirror 204) of the deflector 200. The light beams L reflected by the third reflecting mirror 112 are transmitted through the third lens systems 118A and 118E and are incident on the rotating polygon mirror 204 of the rotating body 210 of the deflector 200.

An fθ lens 120 (see FIGS. 5 and 7 also) is provided on the downstream side of the deflector 200. The four light beams LY, LM, LC, and LK reflected by any of the reflecting surfaces 202 of the rotating polygon mirror 204 enter the fθ lens 120, where the speeds of the scanning movements of the light beams L on the respective photoconductors 34 (see FIG. 1) are made uniform.

Figure 4:
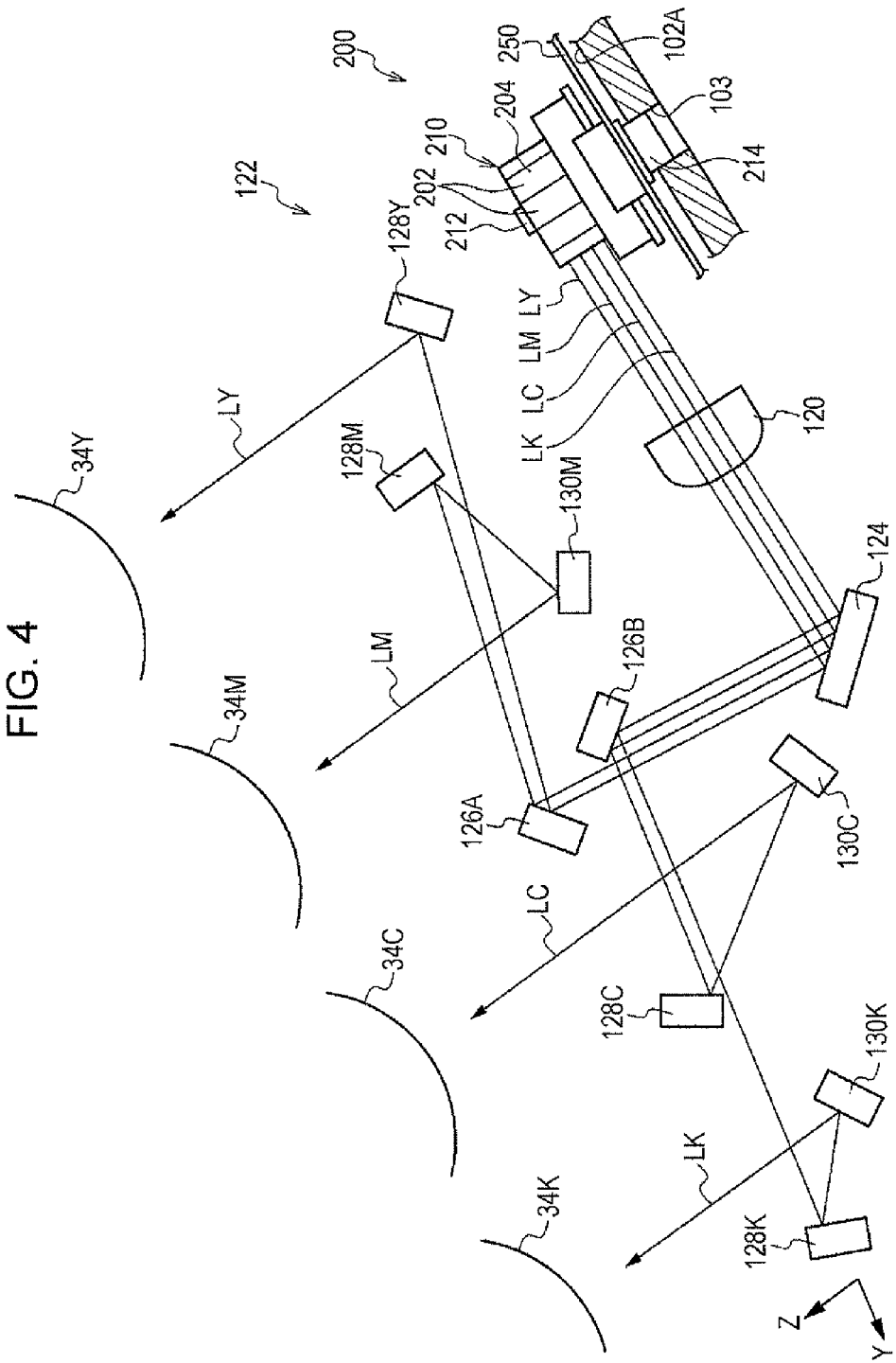
FIG. 4 illustrates the optical paths of the light beams in the optical scanning device according to the exemplary embodiment of the present invention that are seen in a direction in which the light beams are emitted from light sources.

Referring to FIG. 4, a beam-separating optical system 122 that separates the four light beams LY, LM, LC, and LK and emits the light beams LY, LM, LC, and LK toward the photoconductors 34Y, 34M, 34C, and 34K is provided on the downstream side of the fθ lens 120. The beam-separating optical system 122 includes a fourth reflecting mirror (folding mirror) 124, fifth reflecting mirrors 126A and 126B, sixth reflecting mirrors 128Y, 128M, 128C, and 128K, and seventh reflecting mirrors 130M, 130C, and 130K.

The four light beams LY, LM, LC, and LK transmitted through the fθ lens 120 are reflected by the fourth reflecting mirror 124. The light beams LY and LM, which are two of the four light beams LY, LM, LC, and LK reflected by the fourth reflecting mirror 124, are reflected by the fifth reflecting mirror 126A. The light beam LY, which is one of the two light beams LY and LM reflected by the fifth reflecting mirror 126A, is reflected by the sixth reflecting mirror 128Y and travels toward the photoconductor 34Y. The light beam LM is reflected by the sixth reflecting mirror 128M, is reflected by the seventh reflecting mirror 130M, and travels toward the photoconductor 34M.

The light beams LC and LK, which are two of the four light beams LY, LM, LC, and LK reflected by the fourth reflecting mirror 124, are reflected by the fifth reflecting mirror 126B. The light beam LC, which is one of the two light beams LC and LK reflected by the fifth reflecting mirror 126B, is reflected by the sixth reflecting mirror 128C, is reflected by the seventh reflecting mirror 130C, and travels toward the photoconductor 34C. The light beam LK is reflected by the sixth reflecting mirror 128K, is reflected by the seventh reflecting mirror 130K, and travels toward the photoconductor 34K.

Deflector and Attachment of Deflector

The deflector 200 and the attachment of the deflector 200 to the bottom plate 102A of the housing 102 will now be described.

Figure 5:
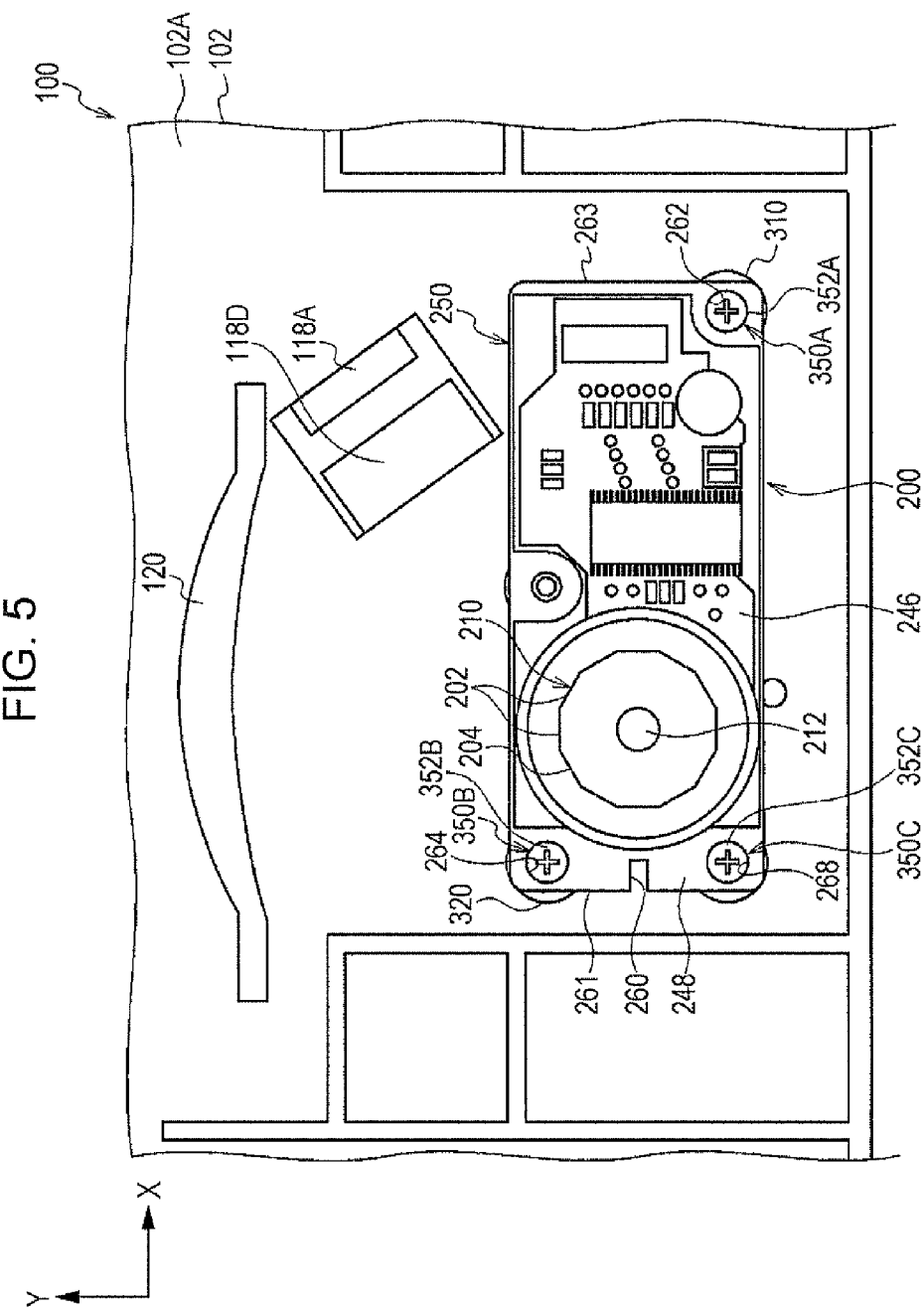
FIG. 5 is a plan view of a deflector, including the rotating body, provided in the optical scanning device according to the exemplary embodiment of the present invention that is seen in the axial direction of the rotating shaft.

Referring to FIGS. 5 and 7, the deflector 200 is fastened to the bottom plate 102A of the housing 102 of the optical scanning device 100 (see FIG. 2 also). As described above, the deflector 200 includes the rotating body 210 including the rotating polygon mirror 204 having the plural (twelve in the exemplary embodiment) reflecting surfaces 202. The rotating body 210 is provided on the circuit board 250 that is fastened to the housing 102.

Figure 8:
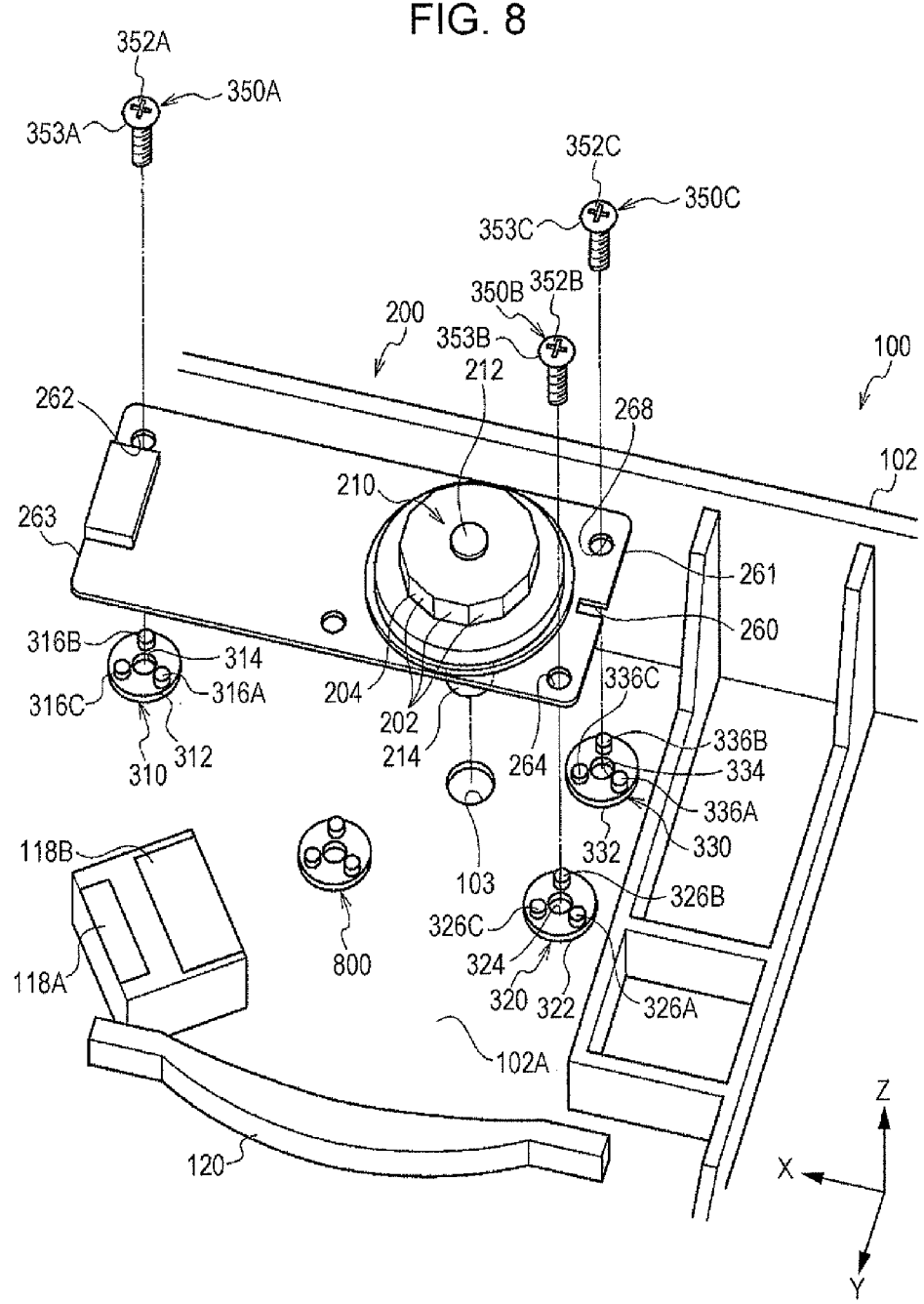
FIG. 8 is an exploded perspective view corresponding to FIG. 7 with the deflector unfastened.
Figure 11:
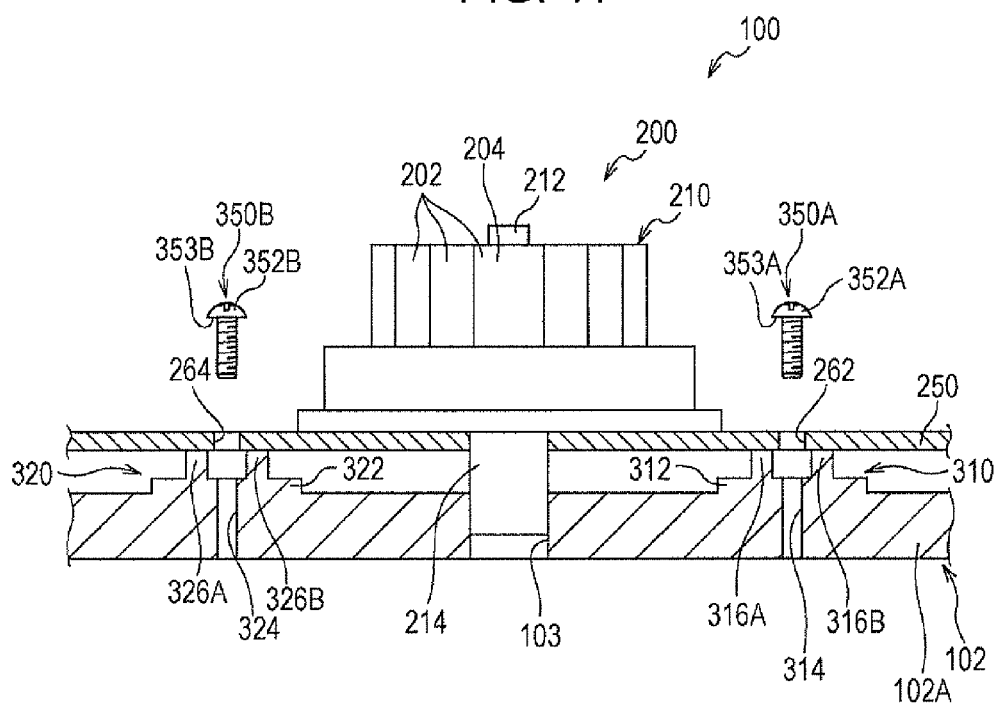
FIG. 11 is a sectional view of the deflector with a projection provided on the rotating body of the deflector being fitted in a fitting hole.

The rotating body 210 is rotated by the driving motor 221, to be described below, about the rotating shaft 212. Referring to FIGS. 4, 8, and 11, the rotating body 210 has a projection 214 as an exemplary positioned portion. The projection 214 has a substantially cylindrical shape. The rotating shaft 212 is rotatably supported in the projection 214. In the exemplary embodiment, the axis of the projection 214 and the axis of the rotating shaft 212 coincide with each other.

Figure 12:
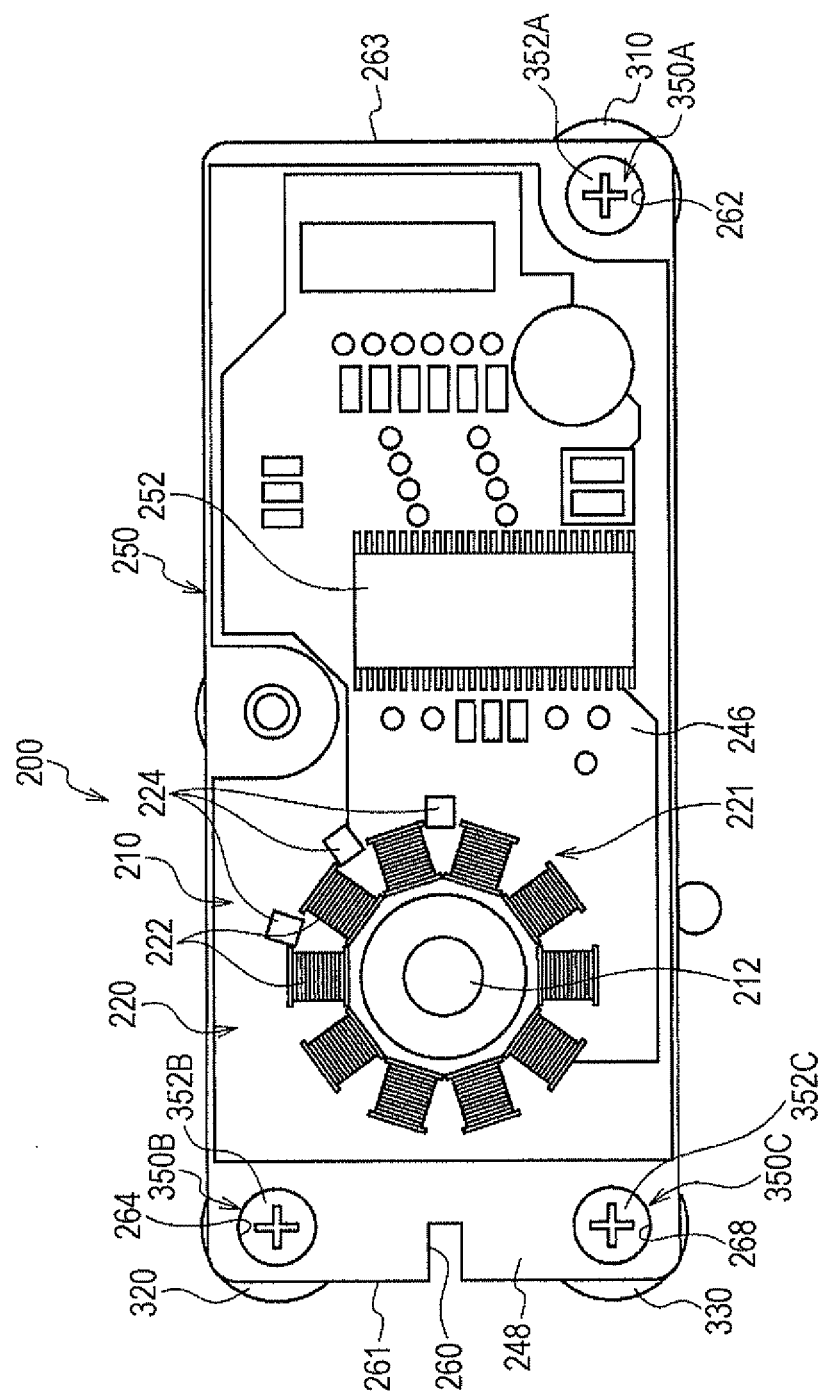
FIG. 12 is a plan view of the deflector seen in the axial direction of the rotating shaft and with the rotating body removed.

Referring to FIG. 12, the rotating body 210 (see FIG. 5 and others) is rotated by the driving motor 221, which includes plural driving coils 222 and plural driving magnets (not illustrated). The plural driving magnets are annularly arranged in the rotating body 210 and are alternately polarized into the north pole and the south pole. The driving coils 222 are fastened at positions facing the driving magnets (not illustrated). The driving coils 222 are connected to wire patterns provided on the circuit board 250. An exciting current supplied in accordance with signals from Hall elements 224 as exemplary position detectors flows through the driving coils 222. When the exciting current flows through the driving coils 222, an induction field is produced between the driving coils 222 and the driving magnets, whereby the rotating body 210 rotates.

In the exemplary embodiment, the circuit board 250 includes a base member 248 made of plate metal and a paper phenolic board 246 attached to the base member 248 by bonding, caulking, or the like. Electronic parts and wire patterns are provided on the paper phenolic board 246. An integrated circuit 252 and so forth are mounted on the upper surface (a side having the wire patterns) of the circuit board 250. The integrated circuit 252 includes a constant-speed control circuit 254 and a driving circuit 258 and controls the switching of the polarity of the driving coils 222. The Hall elements 224, which detect the position of the rotating body 210, are also mounted on the upper surface of the circuit board 250.

Figure 13:
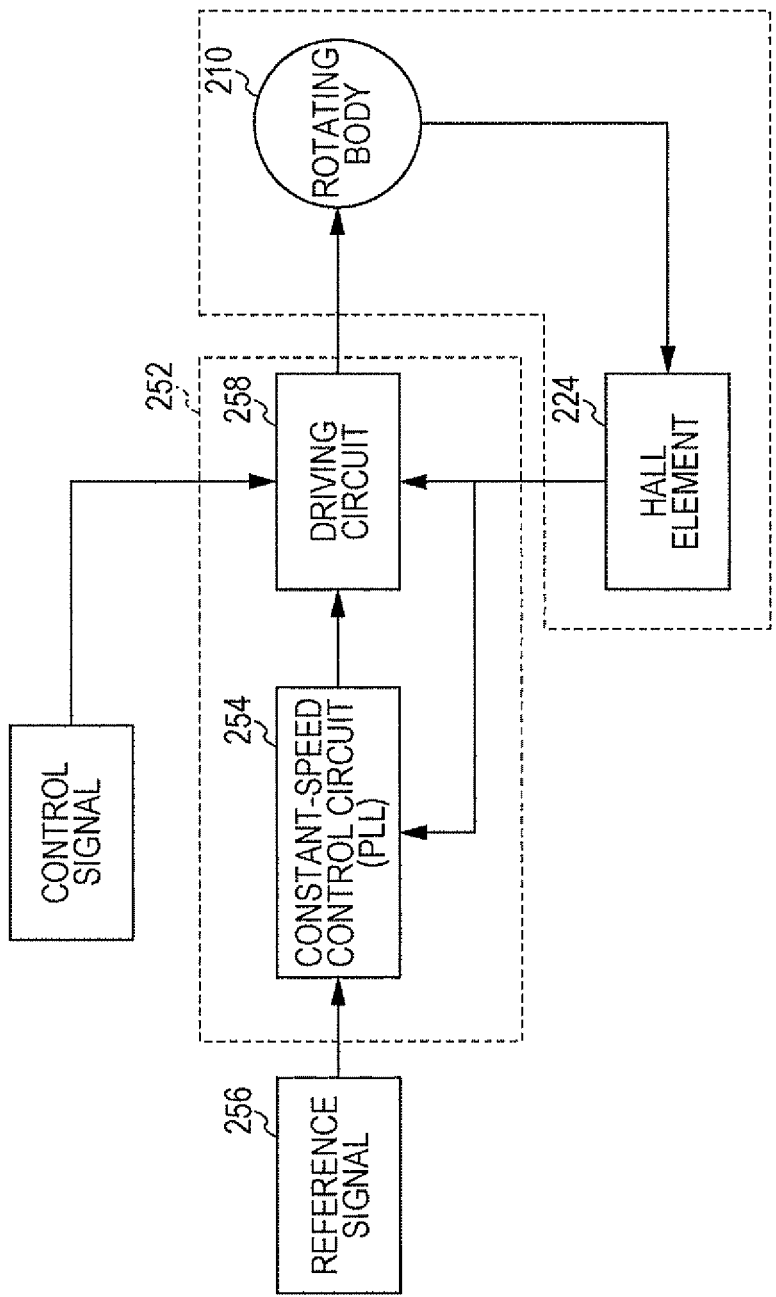
FIG. 13 is a block diagram of a circuit that controls the deflector.

Referring to FIG. 13, information on the speed of the rotating body 210 obtained through the signals from the Hall elements 224 is fed back to the constant-speed control circuit 254 (a phase-locked loop) included in the integrated circuit 252. The information is compared with a reference signal 256 corresponding to an intended number of revolutions. An exciting current that compensates the difference between the two is supplied to the driving circuit 258, which is as an exemplary driving unit. Thus, the rotating body 210 is rotated at a constant speed.

Referring to FIGS. 5, 7, and 8, the circuit board 250 of the deflector 200 has a substantially rectangular plate-like shape when seen in the axial direction of the rotating shaft 212 of the rotating body 210. The long-side direction of the circuit board 250 corresponds to the X direction (the optical-axis direction of the light sources 104, see FIG. 2 also). The rotating body 210 resides on a side of the circuit board 250 nearer to the light sources 104 (see FIG. 2).

The circuit board 250 has a first fastening hole 262 provided in a corner at an end 263 on a side thereof opposite the side having the rotating body 210, a second fastening hole 264 provided in one of the corners on the side thereof having the rotating body 210 (in the corner diagonal to the first fastening hole 262), and an adjusting hole 268 as an exemplary adjusting portion provided in the other corner on the side thereof having the rotating body 210.

Referring to FIG. 14, with respect to a virtual straight line S1 connecting the first fastening hole 262 and the second fastening hole 264, the adjusting hole 268 resides on a side opposite a side from which the light beams L are incident on the rotating body 210 (the rotating polygon mirror 204). When seen in the axial direction of the rotating shaft 212 of the rotating body 210, the rotating body 210 is positioned on the circuit board 250 such that the virtual straight line S1 passes through (extend over) the rotating body 210. The rotating shaft 212 is away from the virtual straight line S1 toward the adjusting hole 268. When seen in the axial direction of the rotating shaft 212 of the rotating body 210, the rotating shaft 212 is positioned inside a virtual triangle R defined by the first fastening hole 262, the second fastening hole 264, and the adjusting hole 268.

The circuit board 250 further has a cut 260 having a substantially U-shaped inner edge (see FIGS. 5, 7, 8, and others also). The cut 260 is provided at an end 261 of the circuit board 250 on the side having the rotating body 210 (between the second fastening hole 264 and the adjusting hole 268). The cut 260 is provided in the base member 248 included in the circuit board 250. The Hall elements 224 are provided on the side of the circuit board 250 opposite the side having the adjusting hole 268 with respect to the virtual straight line S1 when seen in the axial direction of the rotating shaft 212 of the rotating body 210.

Referring to FIGS. 4, 8, and 11, the projection 214 of the rotating body 210 projects from the circuit board 250 and is fitted into a fitting hole 103 as an exemplary fitting portion provided in the bottom plate 102A of the housing 102. Thus, the rotating shaft 212 of the rotating body 210 is positioned (centered) in the bottom plate 102A of the housing 102.

Figure 6:
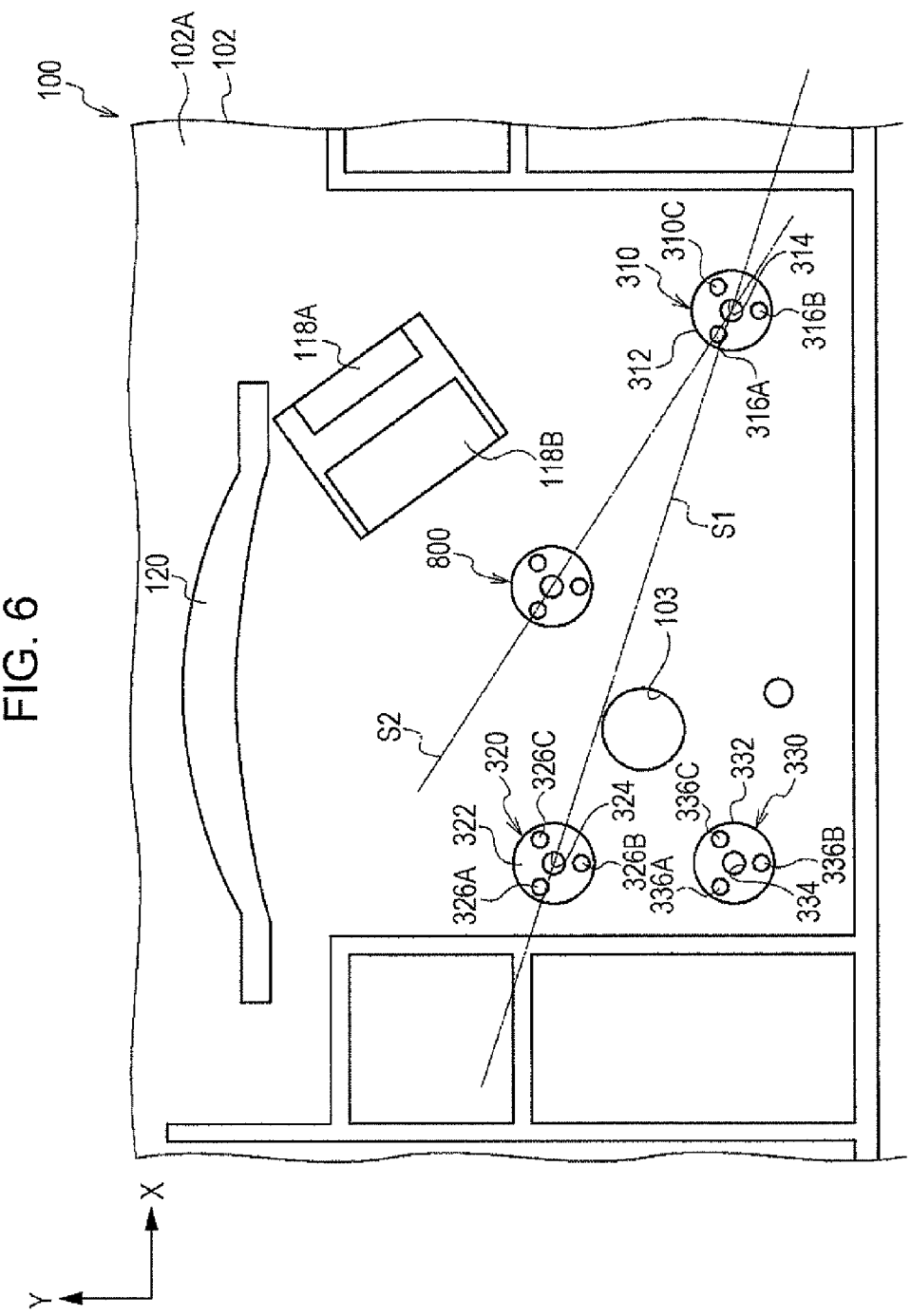
FIG. 6 is a plan view corresponding to FIG. 5 with the deflector removed.
Figure 9A:
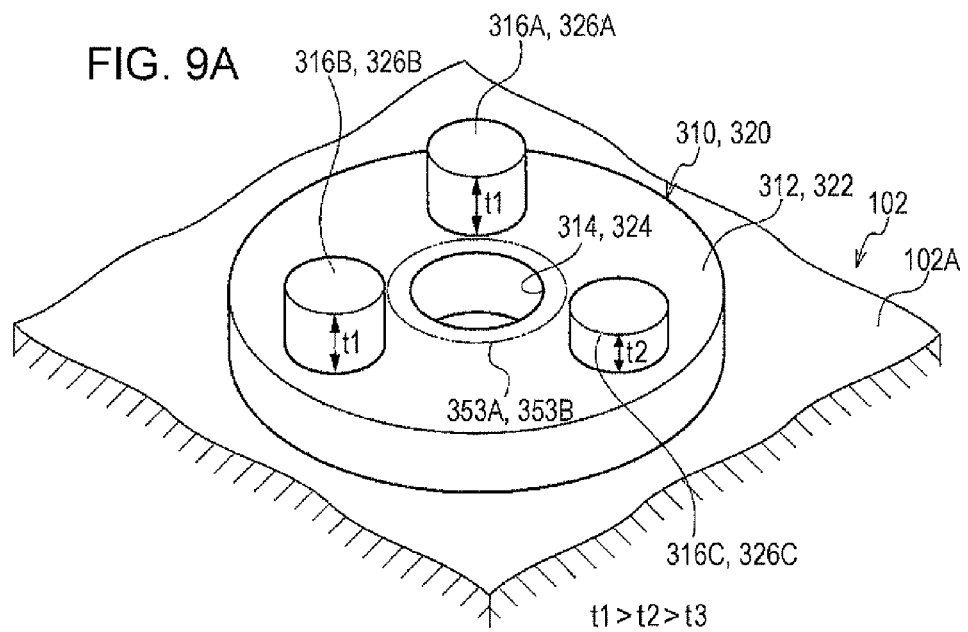
FIG. 9A is a perspective view of a first supporting member or a second supporting member.
Figure 9B:
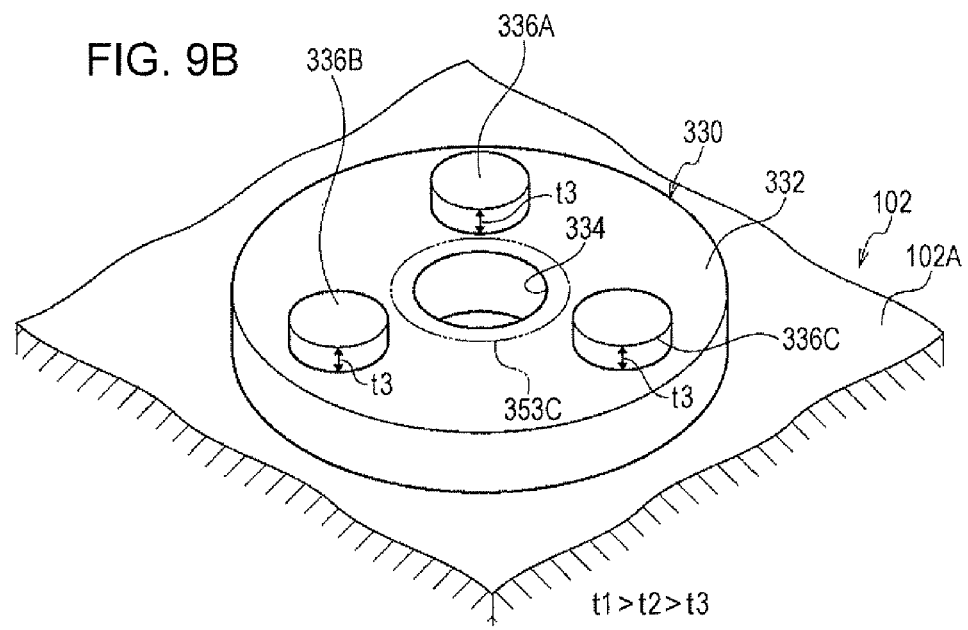
FIG. 9B is a perspective view of an adjustment supporting member.

Referring to FIGS. 6, 8, and 9, the bottom plate 102A of the housing 102 has a first supporting member 310, a second supporting member 320, and an adjustment supporting member 330 at positions corresponding to the first fastening hole 262, the second fastening hole 264, and the adjusting hole 268, respectively. Referring to FIGS. 9A and 9B, the first supporting member 310, the second supporting member 320, and the adjustment supporting member 330 each have a cylindrical portion 312, 322, or 332 and plural (three in the exemplary embodiment) bosses 316A to 316C, 326A to 326C, or 336A to 336C. The cylindrical portions 312, 322, and 332 have respective holes 314, 324, and 334 in the centers thereof. The bosses 316A to 316C, 326A to 326C, and 336A to 336C are provided on the upper surfaces of the respective cylindrical portions 312, 322, and 332 at intervals in the circumferential direction.

The bosses 316A to 316C, 326A to 326C, and 336A to 336C are provided on the radially outer side of bearing surfaces 353A, 353B, and 353C, respectively, of heads 352A, 352B, and 352C of self-tapping screws 350A, 350B, and 350C to be described below (see FIG. 8 and others).

Referring to FIGS. 6 and 9A, the bosses 316C and 326C of the first supporting member 310 and the second supporting member 320 provided on a side opposite the side having the adjusting hole 268 with respect to the virtual straight line S1 (see FIG. 14) have a projecting height (t2) smaller than a projecting height (t1) of the other bosses 316A, 316B, 326A, and 326B (t1>t2). Hence, referring to FIG. 10A, the circuit board 250 is supported with the rotating shaft 212 of the rotating body 210 inclining toward the virtual straight line S1 (details will be described separately below).

Referring to FIG. 9B, the bosses 336A, 336B, and 336C of the adjustment supporting member 330 have a uniform projecting height (t3) that is smaller than the projecting height (t2) of the bosses 316C and 326C (t1>t2>t3).

Attachment of Deflector and Adjustment of Angle of Rotating Shaft of Rotating Body A method of attaching and fastening the deflector 200 to the bottom plate 102A of the housing 102 and a method of adjusting the angle of the rotating shaft 212 of the rotating body 210 will now be described.

Figure 10A:
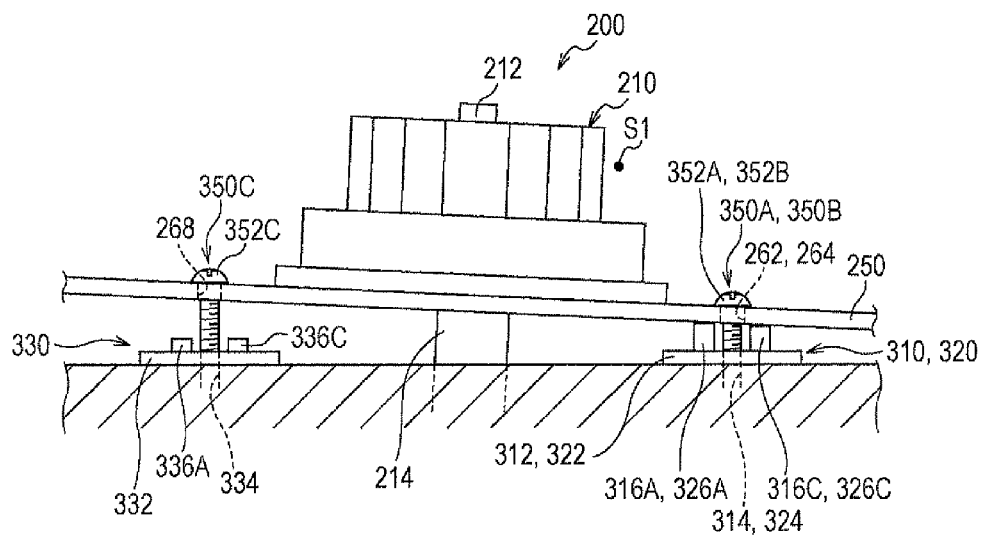
FIG. 10A is a front view of the deflector seen in the X direction and being in an initial inclining state where the angle of the rotating shaft of the rotating body included in the deflector is yet to be adjusted.

Referring to FIGS. 10A and 11, the circuit board 250 of the deflector 200 is placed over the first supporting member 310 and the second supporting member 320 on the bottom plate 102A of the housing 102 such that the projection 214 of the rotating body 210 projecting from the circuit board 250 is fitted into the fitting hole 103 (see FIG. 11) provided in the bottom plate 102A of the housing 102 (see FIGS. 7 and 8 also).

Subsequently, the self-tapping screws 350A and 350B are inserted into the first fastening hole 262 and the second fastening hole 264, respectively, provided in the circuit board 250 and are screwed into the holes 314 and 324, respectively, of the cylindrical portions 312 and 322 of the first supporting member 310 and the second supporting member 320. Subsequently, the self-tapping screw 350C is inserted into the adjusting hole 268 and then the hole 334 of the cylindrical portion 332 of the adjustment supporting member 330.

Figure 16A:
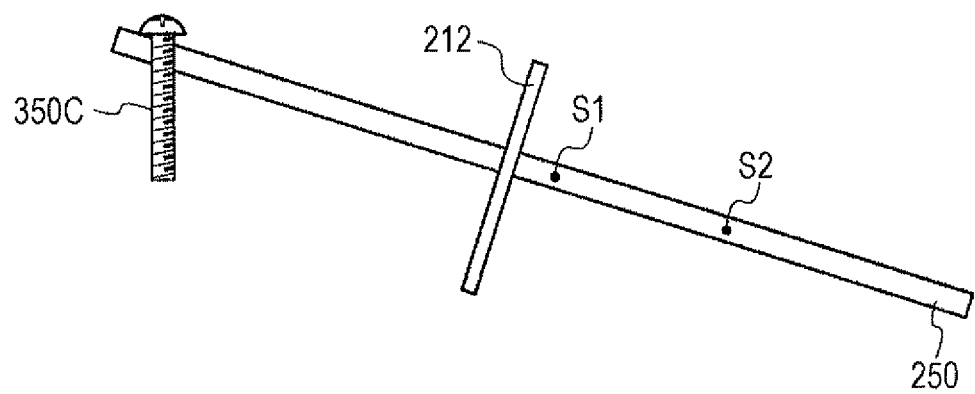
FIG. 16A schematically illustrates the circuit board in the initial inclining state.

Referring to FIGS. 10A and 16A, the projecting height (t2) of the bosses 316C and 326C of the first supporting member 310 and the second supporting member 320 is smaller than the projecting height (t1) of the other bosses 316A, 316B, 326A and 326B (see FIG. 9A also). Hence, in a state before angle adjustment, the circuit board 250 is fastened with the rotating shaft 212 of the rotating body 210 inclining toward the virtual straight line S1. That is, the circuit board 250 is fastened in a state where the rotating shaft 212 inclines relative to the rotating shaft 212 whose angle has been adjusted (see FIGS. 10B and 16B), which will be described separately below. This state is hereinafter referred to as "initial inclining state"

Figure 10B:
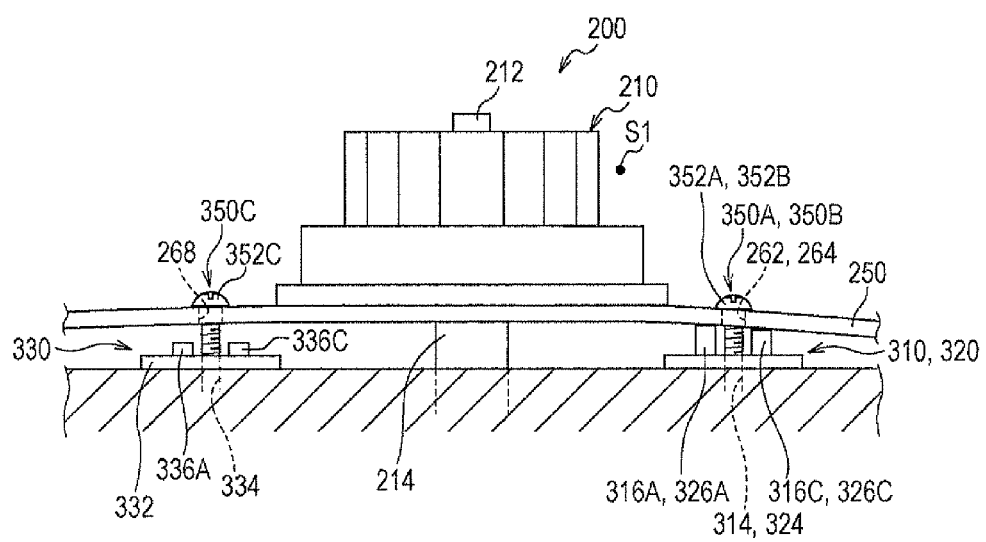
FIG. 10B is a front view of the deflector seen in the X direction and being in a state where the angle of the rotating shaft has been adjusted.
Figure 16B:
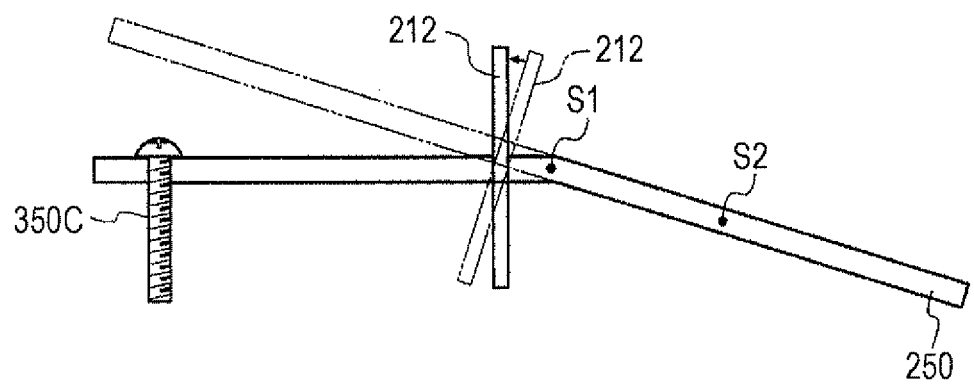
FIG. 16B schematically illustrates the circuit board whose angle has been adjusted.

Subsequently, referring to FIGS. 10B and 16B, the self-tapping screw 350C inserted into the adjusting hole 268 is gradually screwed into the hole 334. As the self-tapping screw 350C is screwed into the hole 334, the side of the circuit board 250 having the rotating body 210 with respect to the virtual straight line S1 gradually bends (rotates) about the virtual straight line S1. As the circuit board 250 gradually bends, the rotating shaft 212 gradually inclines away from the virtual straight line S1 such that the axial direction of the rotating shaft 212 becomes closer to the Z direction. Thus, the angle of the rotating shaft 212 of the rotating body 210 is adjusted. In FIGS. 10A, 10B, 16A, and 16B, the inclination of the rotating shaft 212 is illustrated greater than the actual inclination for easy recognition of the change in the angle.

In the exemplary embodiment, the self-tapping screw 350C is employed. Hence, the angle is only adjusted in the direction in which the self-tapping screw 350C is screwed into the hole 334. The angle may be adjusted by unscrewing the self-tapping screw 350C that has been screwed into the hole 334.

Whether or not the angle of the rotating shaft 212 of the rotating body 210 has fallen within a desired range may be determined in any way. For example, it may be determined that the angle of the rotating shaft 212 has fallen within a desired range if no stray light (ghost light) of each light beam L enters any of the first lens systems 106 (see FIG. 2) other than the one corresponding to that light beam L.

More specifically, for example, suppose that stray light of the light beam LM enters the first lens system 106C adjacent to the first lens system 106M, and stray light of the light beam LC enters the first lens system 106M adjacent to the first lens system 106C. In such a case, if the stray light of the light beams LC and LM no longer enters the first lens systems 106M and 106C, respectively, it is determined that the angle of the rotating shaft 212 has fallen within a desired range.

Operational Functions

Operational functions provided in the exemplary embodiment will now be described.

Operational Function 1

Referring to FIG. 14, the virtual straight line S1 drawn from the first fastening hole 262 to the second fastening hole 264 passes through the rotating body 210. Hence, the virtual straight line S1, which corresponds to the center of bend (center of rotation) of the circuit board 250, resides near the rotating shaft 212 of the rotating body 210. Therefore, the rate of change in the angle of the rotating shaft 212 of the rotating body 210 becomes gentle relative to the rate of screwing of the self-tapping screw 350C used in angle adjustment. Hence, the angle of the rotating shaft 212 of the rotating body 210 is adjustable with high accuracy.

The exemplary embodiment will be described in more detail in comparison with a comparative embodiment in which the circuit board 250 is fastened at the first fastening hole 262 and a third fastening hole 266 that are connected by a virtual straight line S2 extending off the rotating body 210 as illustrated in FIG. 14. In the comparative embodiment employing the third fastening hole 266, a self-tapping screw is screwed into a third supporting member 800 (see FIGS. 6 and 8). The third supporting member 800 (see FIGS. 6 and 8)

has the same configuration as the first supporting member 310 and the second supporting member 320.

Comparing the case based on the virtual straight line S1 extending close to the rotating shaft 212 and the case based on the virtual straight line S2 extending off the rotating shaft 212, the rate of change (bend) in a portion of the circuit board 250 having the rotating shaft 212 relative to the rate of screwing of the self-tapping screw 350C is smaller in the case based on the virtual straight line S1 than in the case based on the virtual straight line S2. That is, the rate of change in the angle of the rotating shaft 212 of the rotating body 210 relative to the rate of screwing of the self-tapping screw 350C used in angle adjustment is gentler in the case based on the virtual straight line S1 than in the case based on the virtual straight line S2.

Figure 17A:
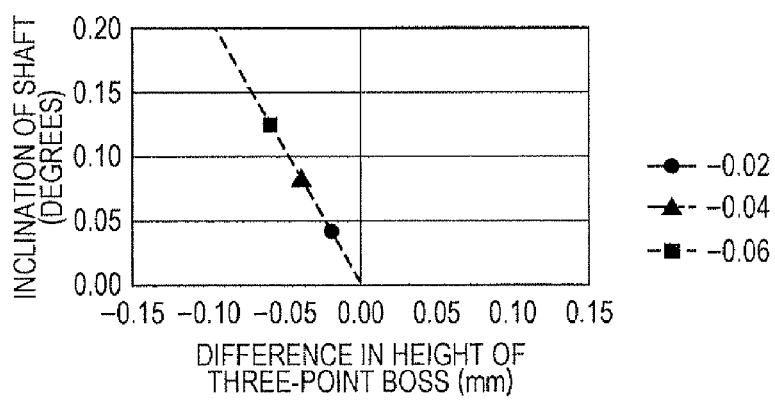
FIG. 17A is a graph illustrating the inclination of the rotating shaft versus the difference in projecting height of bosses in a case based on the virtual straight line S1 illustrated in FIG. 14.
Figure 17B:
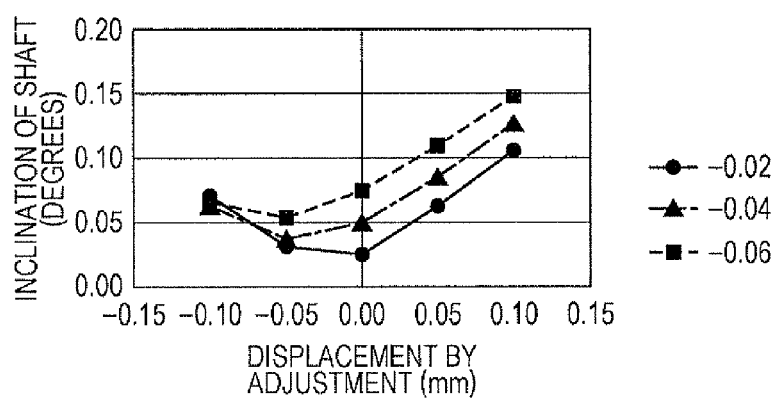
FIG. 17B is a graph illustrating the inclination of the rotating shaft versus the amount of adjustment in the case based on the virtual straight line S1 illustrated in FIG. 14.
Figure 17C:
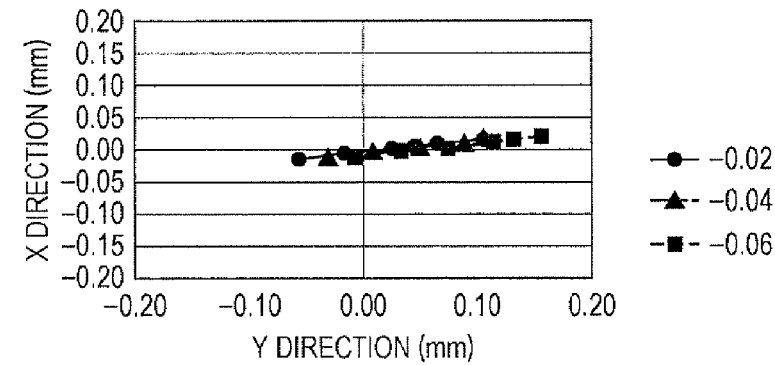
FIG. 17C is a graph illustrating the inclination of the rotating shaft in the X direction and in the Y direction in the case based on the virtual straight line S1 illustrated in FIG. 14.
Figure 18A:
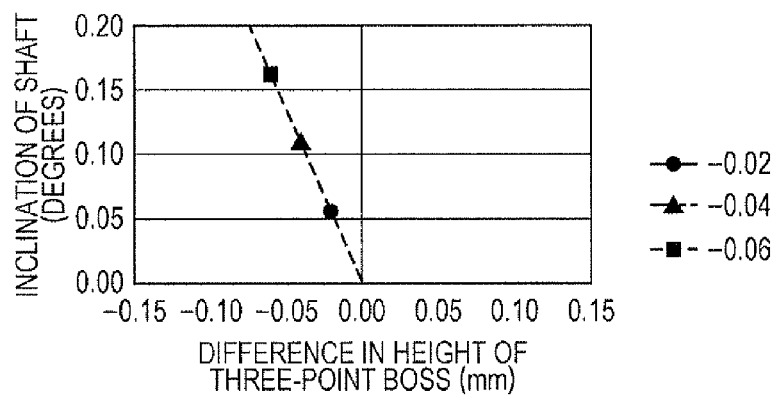
FIG. 18A is a graph illustrating the inclination of the rotating shaft versus the difference in projecting height of bosses in a case based on the virtual straight line S2 illustrated in FIG. 14.
Figure 18B:
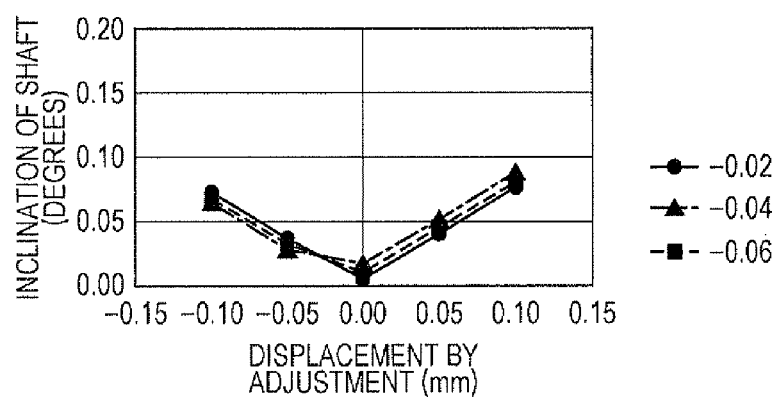
FIG. 18B is a graph illustrating the inclination of the rotating shaft versus the amount of adjustment in the case based on the virtual straight line S2 illustrated in FIG. 14.
Figure 18C:
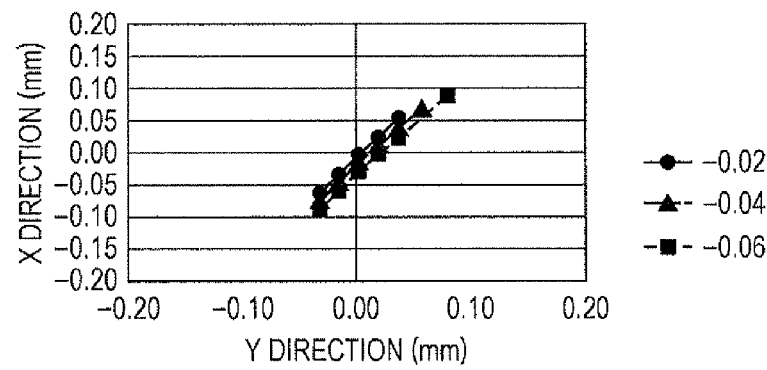
FIG. 18C is a graph illustrating the inclination of the rotating shaft in the X direction and in the Y direction in the case based on the virtual straight line S2 illustrated in FIG. 14.

FIGS. 17A to 17C are graphs illustrating actual changes in the angle of the rotating shaft 212 according to the exemplary embodiment (in the case based on the virtual straight line S1). FIGS. 18A to 18C are graphs corresponding to the graphs illustrated in FIGS. 17A to 17C, respectively, and concerning the comparative embodiment (the case based on the virtual straight line S2). Numerical figures −0.02, −0.04, and −0.06 given in the legend to the drawings each represent the difference (t1−t2) between the projecting height (t1) of the bosses 316A, 316B, 326A, and 326B and the projecting height (t2) of the bosses 316C and 326C (see FIGS. 9A and 9B also).

FIGS. 17A and 18A illustrate the angle of the rotating shaft 212 in the initial inclining state illustrated in FIG. 10A. FIGS. 17B and 18B illustrate the inclination of the rotating shaft 212 observed when the circuit board 250 that has been made horizontally level by using the self-tapping screw 350C for adjustment is displaced by ±0.1 mm. FIGS. 17C and 18C illustrate the amounts of inclination of the rotating shaft 212 in the X direction and in the Y direction observed when the self-tapping screw 350C is gradually screwed into the hole 334.

Comparing the graphs illustrated in FIGS. 17B and 18B, the gradient in a range from −0.1 mm to 0 mm is gentler in the exemplary embodiment. Comparing the graphs illustrated in FIGS. 17C and 18C, the amount of inclination in the exemplary embodiment (the case based on the virtual straight line S1) does not substantially change in the X direction but changes greatly in the Y direction, whereas the amount of inclination in the comparative embodiment (the case based on the virtual straight line S2) changes both in the X direction and in the Y direction. That is, the rate of change in the angle of the rotating shaft 212 of the rotating body 210 relative to the rate of screwing of the self-tapping screw 350C used in angle adjustment is gentler in the exemplary embodiment (the case based on the virtual straight line S1) than in the comparative embodiment (the case based on the virtual straight line S2).

Figure 19:
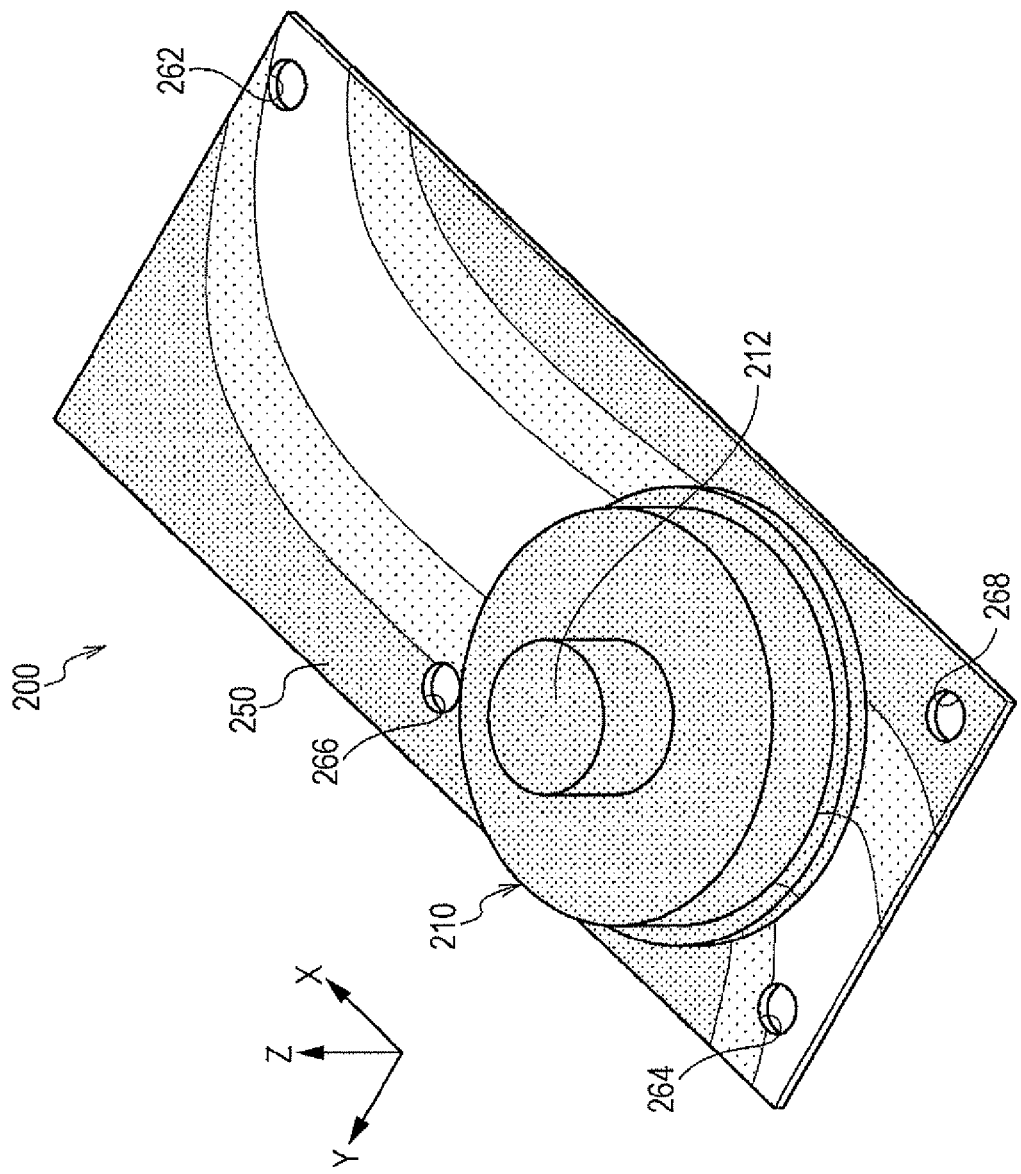
FIG. 19 illustrates a distribution of displacement in the deflector in the case based on the virtual straight line S1 illustrated in FIG. 14.
Figure 20:
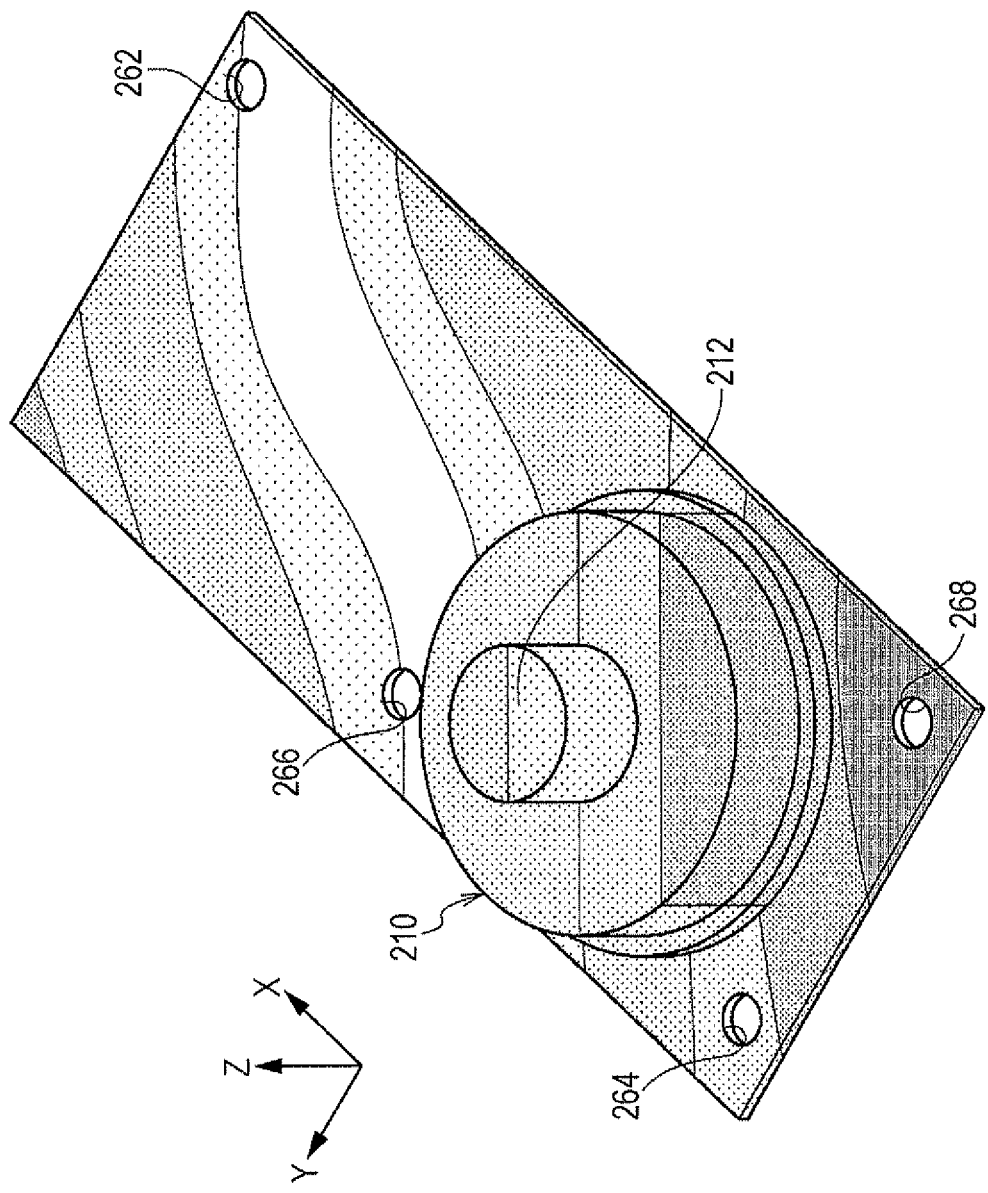
FIG. 20 illustrates a distribution of displacement in the deflector in the case based on the virtual straight line S2 illustrated in FIG. 14.

FIG. 19 illustrates the distribution of displacement in the circuit board 250 resulting from the angle adjustment according to the exemplary embodiment (the case based on the virtual straight line S1). FIG. 20 illustrates the distribution of displacement in the circuit board 250 resulting from the angle adjustment according to the comparative embodiment (the case based on the virtual straight line S2). The denser the dots, the larger the displacement. Comparing the distributions illustrated in FIGS. 19 and 20, the displacement in the circuit board 250 resulting from the same amount of adjustment is smaller in the exemplary embodiment than in the comparative embodiment.

The closer the virtual straight line S1 is to the rotating shaft 212 of the rotating body 210, the more the above phenomena are pronounced. The virtual straight line S1 may pass through the rotating shaft 212 of the rotating body 210. That is, the rotating shaft 212 may reside on the center of bend (rotation). As can be seen from FIGS. 10A, 10B, 16A, and 16B, the side of the circuit board 250 opposite the side having the adjusting hole 268 with respect to the virtual straight line S1 does not substantially bend. Therefore, a configuration in which the virtual straight line S1 resides nearer to the adjusting hole 268 than the rotating shaft 212 of the rotating body 210 is not acceptable. That is, it is not acceptable that the rotating shaft 212 resides at a position of the circuit board 250 farther from the adjusting hole 268 than the virtual straight line S1.

Operational Function 2

Referring to FIG. 14, the adjusting hole 268 of the circuit board 250 resides on the side of the virtual straight line S1 opposite the side from which the light beams L are incident on the rotating polygon mirror 204. Hence, when the angle of the rotating shaft 212 is adjusted by screwing the self-tapping screw 350C for angle adjustment into the hole 334, the light beams L do not tend to interfere with tools used in the adjustment (tools do not tend to block the light beams L). Therefore, the efficiency in the work of adjusting the angle of the rotating shaft 212 of the rotating body 210 by utilizing the light beams L is increased. Consequently, the angle of the rotating shaft 212 is adjusted with high accuracy.

Operational Function 3

Referring to FIG. 14, the rotating shaft 212 of the rotating body 210 resides on the inner side of the virtual triangle R defined by the first fastening hole 262, the second fastening hole 264, and the adjusting hole 268. The area of the circuit board 250 enclosed by the virtual triangle R has the vertices thereof being fastened and therefore has a higher stiffness than an area of the circuit board 250 outside the virtual triangle R that has a cantilever structure. Hence, compared with the case where the rotating shaft 212 of the rotating body 210 resides on the outside of the virtual triangle R, the vibration of the circuit board 250 occurring with the rotation of the rotating body 210 is reduced.

Operational Function 4

Referring to FIG. 10A, the circuit board 250 is preset such that the rotating shaft 212 of the rotating body 210 inclines toward the virtual straight line S1 (so as to be in the initial inclining state). In this state, the self-tapping screw 350C is screwed into the hole 334 and the circuit board 250 is caused to bend as illustrated in FIG. 10B. Consequently, the angle of the rotating shaft 212 is made to incline in a direction away from the virtual straight line S1. Since the angle adjustment using the self-tapping screw 350C is performed in one direction, the angle of the rotating shaft 212 of the rotating body 210 is adjusted with high accuracy.

Operational Function 5

When seen in the axial direction of the rotating shaft 212 of the rotating body 210, the Hall elements 224 are provided on the side of the circuit board 250 opposite the side having the adjusting hole 268 with respect to the virtual straight line S1 (see FIG. 12). If the circuit board 250 is bent, the side of the circuit board 250 opposite the side having the adjusting hole 268 is displaced by a smaller amount than the side of the circuit board 250 having the adjusting hole 268, that is, the change in the positions of the Hall elements 224 with respect to the rotating body 210 is small. Therefore, speed information (signals) transmitted from the Hall elements 224 is less deteriorated while the accuracy in detecting the position of the rotating body 210 is maintained. Thus, the angle of the rotating shaft 212 is adjusted while the accuracy in detecting the position of the rotating body 210 is maintained.

Operational Function 6

The circuit board 250 has the cut 260 having a substantially U-shaped inner edge (see FIGS. 5, 7, 8, and others also). The cut 260 is provided at the end 261 of the circuit board 250 on the side having the rotating body 210 (between the second fastening hole 264 and the adjusting hole 268). Hence, if the circuit board 250 is bent in adjusting the angle of the rotating shaft 212, the stress concentrates around the cut 260, reducing the stress applied to other portions of the circuit board 250 excluding the portion around the cut 260. In addition, in the exemplary embodiment, the cut 260 is provided in the base member 248 included in the circuit board 250. Hence, the deformation of the paper phenolic board 246 having electronic parts and wire patterns is effectively reduced. Consequently, the stress applied to the electronic parts and the wire patterns is effectively reduced.

Furthermore, since the stress concentrates around the cut 260, the rate of change in the amount of bend in the circuit board 250 relative to the rate of screwing of the self-tapping screw 350C is reduced. Therefore, the angle of the rotating shaft 212 is adjusted with higher accuracy than in a case where the cut 260 is not provided.

Now, the distribution of stress applied to the circuit board 250 after the angle adjustment will be described.

FIG. 23 illustrates the distribution of stress applied to the base member 248 of the circuit board 250 after the angle adjustment. The denser the dots, the larger the stress. As can be seen from FIG. 23, the stress concentrates around the cut 260 provided at the end 261 (of the base member 248) of the circuit board 250. Furthermore, the stress applied to the side (of the base member 248) of the circuit board 250 opposite the side having the adjusting hole 268 is smaller than that on the side having the adjusting hole 268.

Operational Function 7

Referring to FIGS. 6 and 9A, the projecting height (t2) of the bosses 316C and 326C provided on the side of the first supporting member 310 and the second supporting member 320, respectively, farther from the adjusting hole 268 than the virtual straight line S1 (see FIG. 14) is smaller than the projecting height (t1) of the other bosses 316A, 316B, 326A and 326B. Hence, the circuit board 250 is supported with the rotating shaft 212 of the rotating body 210 inclining toward the virtual straight line S1. Therefore, if a die for forming the housing 102 includes portions corresponding to the first supporting member 310 and the second supporting member 320 or the bosses 316C and 326C that are nested therein, the projecting height of the bosses 316C and 326C is changeable without changing the entirety of the die for forming the housing 102. That is, the angle of the rotating shaft 212 to be inclined toward the virtual straight line S1 is adjustable in advance without changing the entirety of the die for forming the housing 102. Therefore, in a case where, for example, a deflector having different specifications is employed, the entirety of the die for forming the housing 102 does not need to be changed even if characteristics concerning the inclination of the rotating shaft of the deflector or other specifications are changed greatly.

Operational Function 8

Referring to FIGS. 9B, 10A, and 10B, the adjustment supporting member 330 has the bosses 336A, 336B, and 336C whose projecting height (t3) is smaller than the projecting height (t2) of the bosses 316C and 326C. Hence, the rotating shaft 212 is adjustable over a large range of angles using the self-tapping screw 350C. Furthermore, supposing that the Y direction and the X direction are horizontally level, a portion of the circuit board 250 having the adjusting hole 268 is movable beyond the horizontal level toward the bottom plate 102A. Therefore, the rotating shaft 212 is adjustable over a large range of angles.

Operational Function 9

Referring to FIG. 9A, the bosses 316A to 316C, 326A to 326C, and 336A to 336C are provided on the outer side of the bearing surfaces 353A, 353B, and 353C, respectively, of the heads 352A, 352B, and 352C of the self-tapping screws 350A, 350B, and 350C (see FIG. 8 and others). Such a configuration reduces the probability that the rotating shaft 212 may incline because of contact between the bearing surfaces 353A, 353B, and 353C and any of the bosses 316A to 316C, 326A to 326C, and 336A to 336C.

Other Operational Functions

Since the angle of the rotating shaft 212 of the rotating body 210 is adjustable with high accuracy as described above, the following operational functions are also provided.

Figure 15A:
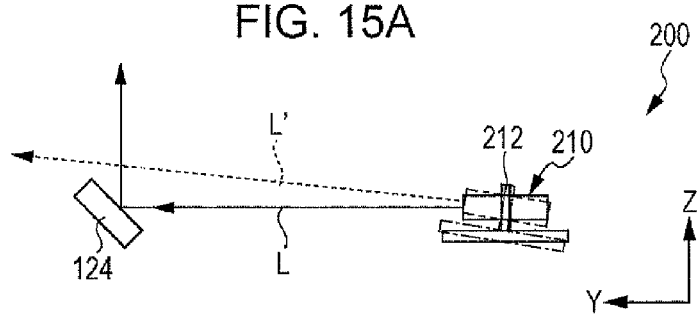
FIG. 15A illustrates the deviation of the light beams due to the inclination of the rotating shaft of the rotating body included in the deflector.

Referring to FIG. 15A, since the angle of the rotating shaft 212 of the rotating body 210 is adjustable with high accuracy, the deviation (shifting) of the light beams L is reduced.

For example, in the comparative embodiment in which the accuracy in the adjustment of the angle of the rotating shaft 212 of the rotating body 210 is low and the inclination of the rotating shaft 212 is large, the path of light beams L' deviates (shifts) largely. Such light beams L' may not hit the fourth reflecting mirror 124 included in the beam-separating optical system 122. In that case, the size of the fourth reflecting mirror 124 needs to be increased.

In contrast, in the exemplary embodiment in which the angle of the rotating shaft 212 of the rotating body 210 is adjustable with high accuracy, the deviation (shifting) of the path of the light beams L is reduced. Therefore, the size of the fourth reflecting mirror 124 included in the beam-separating optical system 122 may be reduced.

Furthermore, since the angle of the rotating shaft 212 of the rotating body 210 is adjustable with high accuracy, variations in characteristics such as the shape of scanning lines and the curvature of field are reduced.

Figure 15B:
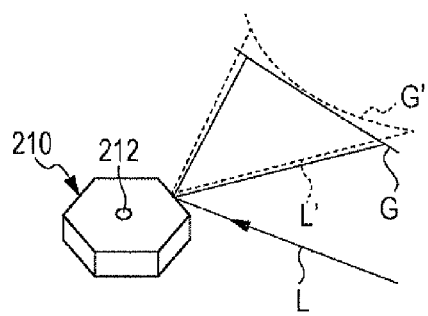
FIG. 15B illustrates a change in the shape of scanning lines due to the inclination of the rotating shaft.

Specifically, referring to FIG. 15B, in the comparative embodiment in which the accuracy in the adjustment of the angle of the rotating shaft 212 of the rotating body 210 is low and the inclination of the rotating shaft 212 is large, scanning lines G' may curve because the incident angle of the light beams L' with respect to the normal to the rotating polygon mirror 204 changes.

In contrast, in the exemplary embodiment in which the angle of the rotating shaft 212 of the rotating body 210 is adjustable with high accuracy, curving of scanning lines G is suppressed because the change in the incident angle of the light beams L with respect to the normal to the rotating polygon mirror 204 is reduced.

Figure 15C:
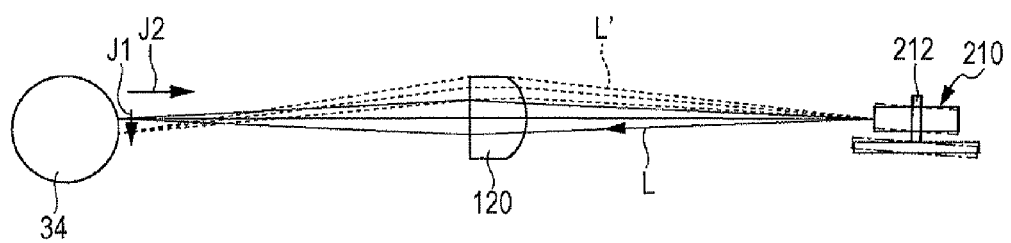
FIG. 15C illustrates changes in the image field due to the inclination of the rotating shaft.

Furthermore, referring to FIG. 15C, in the comparative embodiment in which the accuracy in the adjustment of the angle of the rotating shaft 212 of the rotating body 210 is low and the inclination of the rotating shaft 212 is large, the positions of image fields and the positions of drawing of images formed on the photoconductors 34 by the light beams L' may be shifted as represented by arrows J1 and J2 because the points and angles of incidence of the light beams L' on the fθ lens 120 change.

In contrast, in the exemplary embodiment in which the angle of the rotating shaft 212 of the rotating body 210 is adjustable with high accuracy, changes in the points and angles of incidence of the light beams L on the fθ lens 120 are reduced. Consequently, changes in the positions of image fields and the positions of drawing of images formed on the photoconductors 34 by the light beams L are reduced.

Modification

A modification of the exemplary embodiment will now be described.

Figure 21:
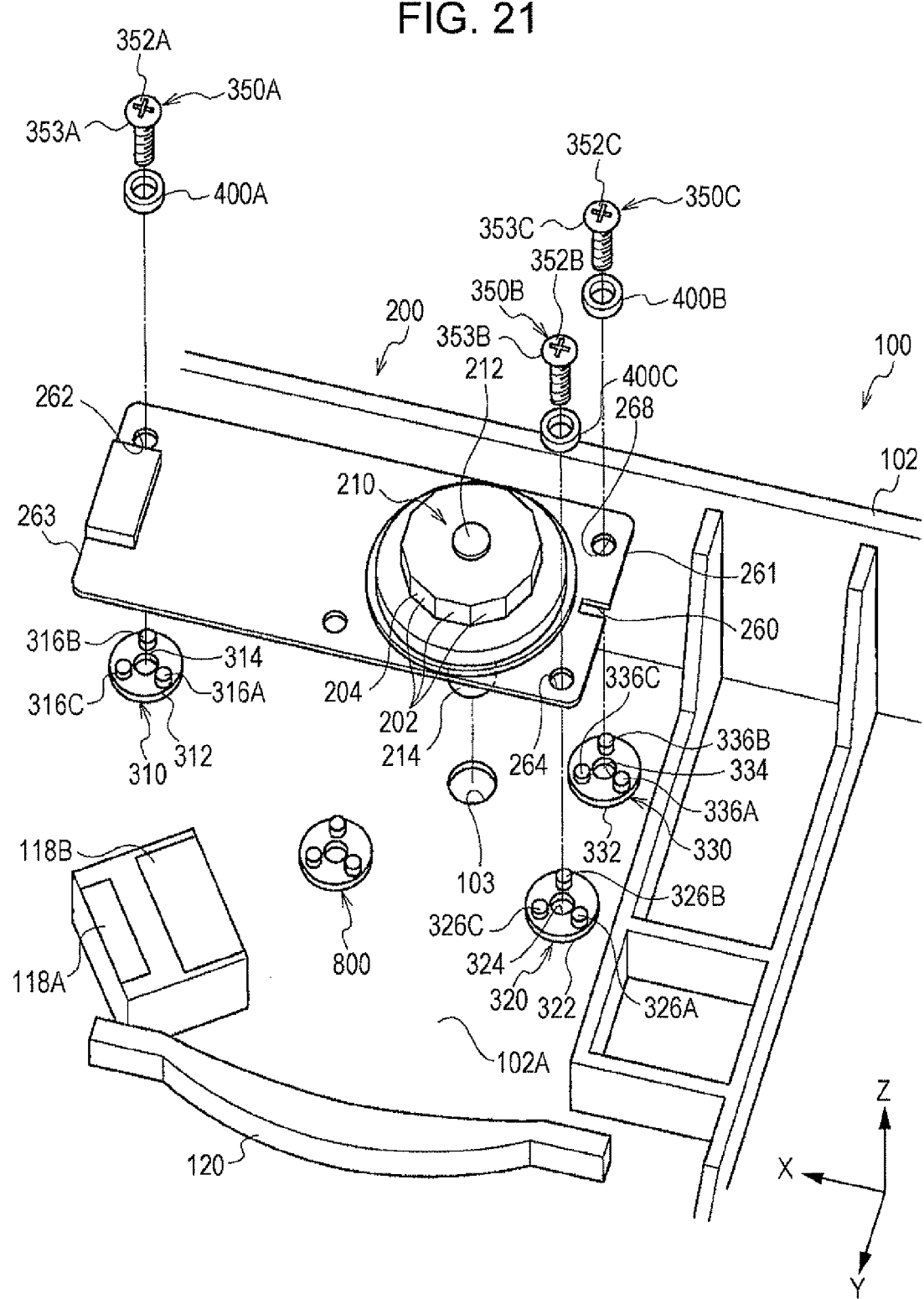
FIG. 21 is an exploded perspective view corresponding to FIG. 8 and illustrating a modification of the exemplary embodiment of the present invention.
Figure 22A:
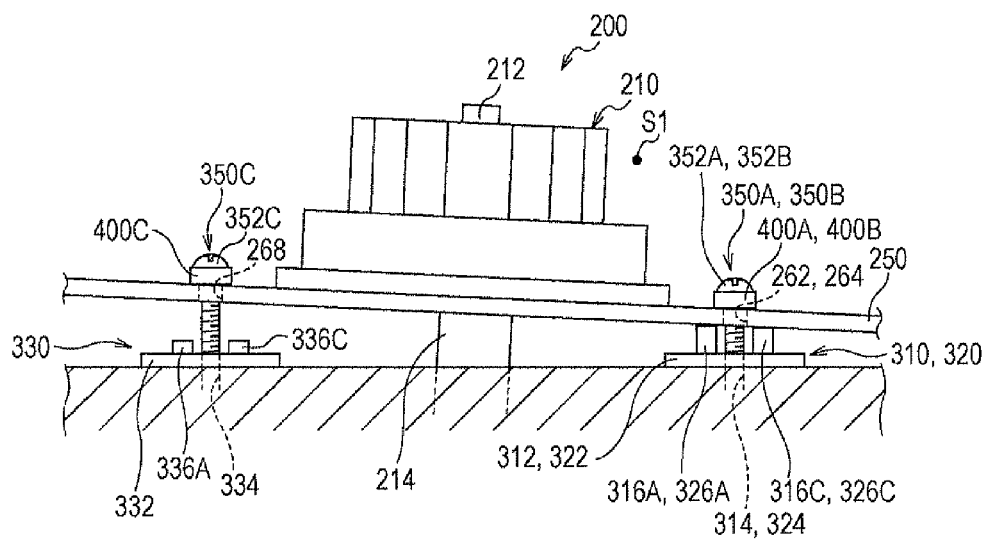
FIG. 22A is a front view corresponding to FIG. 10A and illustrating the modification of the exemplary embodiment of the present invention.
Figure 22B:
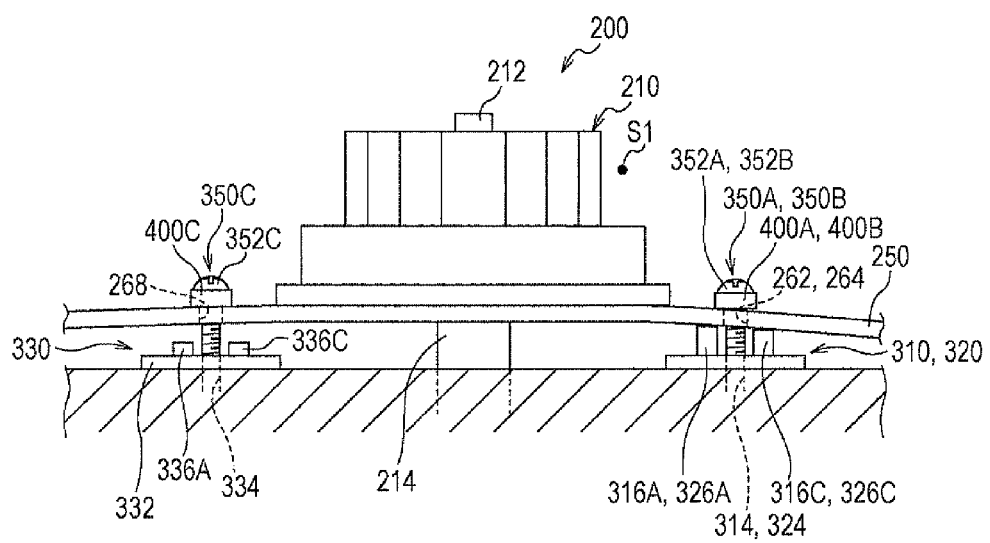
FIG. 22B is a front view corresponding to FIG. 10B and illustrating the modification of the exemplary embodiment of the present invention.

In the modification, referring to FIGS. 21, 22A, and 22B, ring-shaped rubber members 400A, 400B, and 400C as exemplary elastic members are interposed between the circuit board 250 and the bearing surfaces 353A, 353B, and 353C, respectively, of the heads 352A, 352B, and 352C of the self-tapping screws 350A, 350B, and 350C.

With the rubber members 400A, 400B, and 400C interposed between the circuit board 250 and the bearing surfaces 353A, 353B, and 353C, errors (variations) in the angle of insertion of the self-tapping screws 350A, 350B, and 350C are reduced. Consequently, variations in the angle of the rotating shaft 212 of the rotating body 210 are reduced.

Other Exemplary Embodiments

The present invention is not limited to the above exemplary embodiment.

For example, while the above exemplary embodiment concerns a case where the self-tapping screw 350C is employed, the present invention is not limited to such a case. The adjustment supporting member 330 may have threads provided therein in advance or may be provided with a helicoid insert for the use of a normal screw. In that case, the angle may be adjusted by unscrewing the screw that has been screwed into the adjustment supporting member 330.

The configuration of the image forming apparatus is also not limited to that described in the above exemplary embodiment, and various other configurations are acceptable. Moreover, it is obvious that the present invention can be embodied in various other ways within the scope thereof.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical scanning device comprising:
   a rotating body having a rotation mirror that deflects a light beam emitted from a light source and a rotating shaft which supports the rotation mirror;
   a circuit board having a supporting member and a driving unit, the rotating body being rotatably supported by the supporting member, the driving unit driving the rotating body;
   a container having a positioning portion that positions a positioned portion included in the rotating body, the positioned portion projecting from the circuit board, the container containing the rotating body and the circuit board;
   a first fastening portion and a second fastening portion that fasten the circuit board to the container; and
   an adjusting portion that adjusts an angle of the rotating shaft of the rotating body with respect to the container,
   wherein the first fastening portion and the second fastening portion are provided such that a virtual straight line drawn on the circuit board from the first fastening portion to the second fastening portion passes through the rotating body when seen in an axial direction of the rotating shaft of the rotating body, and
   wherein the adjusting portion is provided on a side of the virtual straight line on which the entire rotating shaft is provided so that the rotating shaft is completely located on the same side of the virtual straight line that the adjusting portion is located.

2. The optical scanning device according to claim 1, wherein the adjusting portion is provided on a side of the circuit board, with respect to the virtual straight line, opposite a side from which the light beam is incident on the rotation mirror.

3. The optical scanning device according to claim 1, wherein the rotating shaft is provided on the inner side of a virtual triangle defined by the first fastening portion, the second fastening portion, and the adjusting portion when seen in the axial direction of the rotating shaft of the rotating body.

4. An image forming apparatus comprising:
   the optical scanning device according to claim 1 that forms a latent image by scanningly applying the light beam to a surface of a latent image carrier charged by a charging unit; and
   a developing unit that develops the latent image on the latent image carrier by providing developer to the latent image.

* * * * *